US010726260B2

(12) United States Patent
Gottemukkula et al.

(10) Patent No.: US 10,726,260 B2
(45) Date of Patent: *Jul. 28, 2020

(54) FEATURE EXTRACTION AND MATCHING FOR BIOMETRIC AUTHENTICATION

(71) Applicant: EyeVerify Inc., Kansas City, MO (US)

(72) Inventors: Vikas Gottemukkula, Kansas City, MO (US); Reza R. Derakhshani, Shawnee, KS (US); Sashi K. Saripalle, Kansas City, MO (US)

(73) Assignee: EyeVerify Inc., Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/781,269

(22) Filed: Feb. 4, 2020

(65) Prior Publication Data

US 2020/0175250 A1 Jun. 4, 2020

Related U.S. Application Data

(60) Division of application No. 15/906,331, filed on Feb. 27, 2018, now Pat. No. 10,664,700, which is a (Continued)

(51) Int. Cl.
*G06K 9/46* (2006.01)
*G06K 9/00* (2006.01)
(Continued)

(52) U.S. Cl.
CPC ....... *G06K 9/0061* (2013.01); *G06K 9/00597* (2013.01); *G06K 9/00604* (2013.01);
(Continued)

(58) Field of Classification Search
CPC ........... G06K 9/00926; G06K 9/00288; G06K 9/00221; G06K 9/00597–9/00617;
(Continued)

(56) References Cited

U.S. PATENT DOCUMENTS 5,361,307 A * 11/1994 Hartley ................. G06T 7/0006
348/E17.002
6,185,316 B1 2/2001 Buffam
(Continued)

FOREIGN PATENT DOCUMENTS

JP 2001-160142 A 6/2001
JP 2002-238859 A 8/2002
(Continued)

OTHER PUBLICATIONS

U.S. Appl. No. 14/597,329, filed Jan. 15, 2015, Biometric Template Security and Key Generation, Derakhshani et al.
(Continued)

*Primary Examiner* — Brian Werner
(74) *Attorney, Agent, or Firm* — Goodwin Procter LLP

(57) ABSTRACT

In a feature extraction and pattern matching system, image sharpening can enable vascular point detection (VPD) for detecting points of interest from visible vasculature of the eye. Pattern Histograms of Extended Multi-Radii Local Binary Patterns and/or Pattern Histograms of Extended Multi-Radii Center Symmetric Local Binary Patterns can provide description of portions of images surrounding a point of interest, and enrollment and verification templates can be generated using points detected via VPD and the corresponding descriptors. Inlier point pairs can be selected from the enrollment and verification templates, and a first match score indicating similarity of the two templates can be computed based on the number of inlier point pairs and one or more parameters of a transform selected by the inlier detection. A second match score can be computed by applying the selected transform, and either or both scores can be used to authenticate the user.

16 Claims, 11 Drawing Sheets

Related U.S. Application Data continuation of application No. 15/259,902, filed on Sep. 8, 2016, now Pat. No. 9,940,517, which is a continuation of application No. 14/933,539, filed on Nov. 5, 2015, now Pat. No. 9,454,700, which is a division of application No. 14/274,385, filed on May 9, 2014, now Pat. No. 9,390,327.

(60) Provisional application No. 61/878,588, filed on Sep. 16, 2013.

(51) Int. Cl.
*G06T 11/60* (2006.01)
*G06T 3/00* (2006.01)
*G06K 9/62* (2006.01)

(52) U.S. Cl.
CPC ..... *G06K 9/00617* (2013.01); *G06K 9/00885* (2013.01); *G06K 9/00926* (2013.01); *G06K 9/6201* (2013.01); *G06K 9/6212* (2013.01); *G06K 9/6215* (2013.01); *G06T 3/00* (2013.01); *G06T 11/60* (2013.01); *G06K 2009/00932* (2013.01); *G06K 2009/4666* (2013.01)

(58) Field of Classification Search
CPC .......... G06K 2009/00932; G06F 21/32; H04L 63/0861; G07C 9/37
See application file for complete search history.

(56) References Cited

U.S. PATENT DOCUMENTS

| | | | |
|---|---|---|---|
| 6,836,554 | B1 | 12/2004 | Bolle et al. |
| 7,822,238 | B2 | 10/2010 | Bolle et al. |
| 7,936,905 | B2 | 5/2011 | Takahashi et al. |
| 7,962,754 | B2 | 6/2011 | Fujii et al. |
| 8,005,277 | B2 | 8/2011 | Tulyakov et al. |
| 8,204,279 | B2 | 6/2012 | Takahashi et al. |
| 8,249,314 | B2 | 8/2012 | Bolle et al. |
| 8,290,221 | B2 | 10/2012 | Choi et al. |
| 8,355,544 | B2 | 1/2013 | Gomez-Ulla De Irazazabal et al. |
| 8,369,595 | B1 | 2/2013 | Derakhshani et al. |
| 8,532,344 | B2 | 9/2013 | Connell et al. |
| 8,699,799 | B2 | 4/2014 | Moon et al. |
| 8,811,681 | B2 | 8/2014 | Watanabe |
| 8,965,066 | B1 | 2/2015 | Derakhshani et al. |
| 9,053,365 | B2 | 6/2015 | Gottemukkula et al. |
| 2006/0029262 | A1 | 2/2006 | Fujimatsu et al. |
| 2006/0280340 | A1* | 12/2006 | Derakhshani ...... G06K 9/00597 382/117 |
| 2007/0110283 | A1* | 5/2007 | Hillhouse ............ G06K 9/6255 382/115 |
| 2007/0217708 | A1 | 9/2007 | Bolle et al. |
| 2007/0253608 | A1 | 11/2007 | Tulyakov et al. |
| 2008/0021840 | A1 | 1/2008 | Beenau et al. |
| 2008/0037833 | A1 | 2/2008 | Takahashi et al. |
| 2008/0072063 | A1 | 3/2008 | Takahashi et al. |
| 2008/0285815 | A1 | 11/2008 | Bolle et al. |
| 2009/0154792 | A1 | 6/2009 | Sun et al. |
| 2009/0175508 | A1 | 7/2009 | Connell et al. |
| 2009/0262990 | A1 | 10/2009 | Choi et al. |
| 2009/0310830 | A1 | 12/2009 | Bolle et al. |
| 2010/0092048 | A1 | 4/2010 | Pan et al. |
| 2010/0232659 | A1 | 9/2010 | Rahmes et al. |
| 2010/0309303 | A1 | 12/2010 | Sanchez Ramos et al. |
| 2011/0001607 | A1 | 1/2011 | Kamakura |
| 2011/0058712 | A1 | 3/2011 | Sanchez Ramos |
| 2011/0123072 | A1 | 5/2011 | Moon et al. |
| 2011/0138187 | A1 | 6/2011 | Kaga et al. |
| 2011/0182483 | A1 | 7/2011 | Du et al. |
| 2011/0200234 | A1 | 8/2011 | Takahashi et al. |
| 2012/0114195 | A1 | 5/2012 | Matsuda et al. |
| 2012/0150450 | A1 | 6/2012 | Monden |
| 2012/0163678 | A1 | 6/2012 | Du et al. |
| 2012/0249297 | A1 | 10/2012 | Du et al. |
| 2012/0288167 | A1* | 11/2012 | Sun ..................... G06K 9/00281 382/118 |
| 2013/0028474 | A1* | 1/2013 | Silver ................. G06K 9/6202 382/103 |
| 2013/0243267 | A1 | 9/2013 | Sezille |
| 2016/0147987 | A1 | 5/2016 | Jang et al. |

FOREIGN PATENT DOCUMENTS

| | | |
|---|---|---|
| JP | 2008-52701 A | 3/2008 |
| JP | 2013-37539 A | 2/2013 |
| JP | 2013-142961 A | 7/2013 |
| WO | WO-1998/025227 A1 | 6/1998 |

OTHER PUBLICATIONS

U.S. Appl. No. 14/639,531, filed Mar. 5, 2015, Biometric Template Security and Key Generation, Derakhshani et al.
U.S. Appl. No. 15/222,363, filed Jul. 28, 2016, Biometric Template Security and Key Generation, Derakhshani et al.
U.S. Appl. No. 14/274,385, filed May 9, 2014, Feature Extraction and Matching for Biometric Authentication, Gottemukkula, et al.
U.S. Appl. No. 14/933,539, filed Nov. 5, 2015, Feature Extraction and Matching for Biometric Authentication, Gottemukkula, et al.
U.S. Appl. No. 15/259,902, filed Sep. 8, 2016, Feature Extraction and Matching for Biometric Authentication, Gottemukkula, et al.
U.S. Appl. No. 15/906,331, filed Feb. 27, 2018, Feature Extraction and Matching for Biometric Authentication, Gottemukkula, et al.
U.S. Appl. No. 16/781,554, filed Feb. 4, 2020, Feature Extraction and Matching for Biometric Authentication, Gottemukkula, et al.
Annex to Form PCT/ISA/206 Communication Relating to the Results of the Partial International Search for International Patent Application No. PCT/US2014/055869 dated Dec. 18, 2014, 3 pages.
Cavoukian, A., et al., (Oct. 26, 2011) "Biometric Encryption," Encyclopedia of Cryptography and Security, 2nd ed., pp. 90-98.
Choi, Alex, et al., (2008), "Ch 13: Hand Vascular Pattern Technology", In: Anil K. Jain, Patrick Flynn, Arun A. Ross: "Handbook of Biometrics", pp. 253-270.
Choras, Ryszard, et al., (Jan. 1, 2011), "Ocular Biometrics— Automatic Feature Extraction from Eye Images", 10th WSEAS International Conference on Telecommunications and Informatics and Microelectronics, Nanoelectronics, Optoelectronics, pp. 179-183.
Didaci, L., et al. (2014) "Analysis of unsupervised template update in biometric recognition systems," Pattern Recognition Letters, vol. 37, pp. 151-160.
International Search Report and Written Opinion for International Patent Application No. PCT/US2014/055826 dated Dec. 12, 2014, 11 pages.
International Search Report and Written Opinion for International Patent Application No. PCT/US2014/055869 dated Mar. 5, 2015, 16 pages.
Khalil-Hani, M, et al., (Jun. 28-Jul. 2, 2010), "Security Cryptographic Key with Fuzzy Vault Based on a New Chaff Generation Method," 2010 International Conference on High Performance Computing and Simulation (HPCS), pp. 259-265.
Meenakshi, V. S. and Padmavathi, G., "Securing Iris Templates using Combined User and Soft Biometric based Password Hardened Fuzzy Vault," Int. J Computer Sci. and Information Security (IJCSIS); 7(2):1-8; Feb. 2010.
Meenakshi, V. S. and Padmavathi, G., "Securing Revocable Iris and Retinal Templates Using Combined User and Soft Biometric Based Password Hardened Multimodal Fuzzy Vault," Int. J Computer Sci. and Information Security (IJCSIS); 7(5):159-167; Sep. 2010.
Meenakshi, V. S., (Oct. 27-28, 2009) "Security Analysis of Hardened Retina Based Fuzzy Vault," International Conference on Advances in Recent Technologies in Communication and Computing, ArtCom '09, pp: 926-930.

(56) References Cited

OTHER PUBLICATIONS

Ojala, Timo, et al., (Jul. 1, 2002), "Multiresolution Gray-Scale and Rotation Invariant Texture Classification with Local Binary Patterns", IEEE Transactions on Pattern Analysis and Machine Intelligence, IEEE Computer Society, vol. 24, No. 7, pp. 971-987.

Qamber, Sana, et al., (Dec. 20, 2012), "Personal Identification System Based on Vascular Pattern of Human Retina", Bimedical Engineering Conference (CIBEC), 2012 Cairo International, IEEE, pp. 64-67.

Tavakoli, Hamed, et al., (Aug. 25, 2010), "Study of Gabor and Local Binary Patterns for Retinal Image Analysis", Advanced Computational Intelligence (IWACI), 2010 Third International Workshop, IEEE, pp. 527-532.

Trefny, J. And Matas, J., "Extended Set of Local Binary Patterns for Rapid Object Detection," Computer Vision Winter Workshop 201 O; Feb. 3-5, 201 O; 7 pgs.

Uludag, et al., (Jun. 28, 2005) "Fuzzy Vault for Fingerprints," Lecture Notes in Computer Science, 3546, pp: 310-319.

Uludag, U., et al. (2004) "Biometric template selection and update: a case study in fingerprints," The Journal of the Pattern Recognition Society, vol. 37, pp. 1533-1542.

Yoon, S., et al., "Altered Fingerprints: Analysis and Detection," IEEE Trans Pattern Anal Mach Intell.; 34(3):451-464; Mar. 2012.

\* cited by examiner

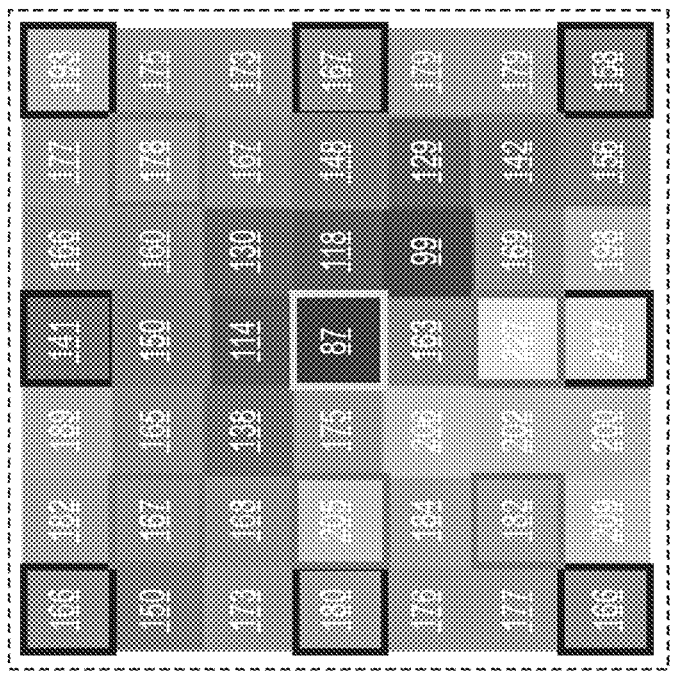
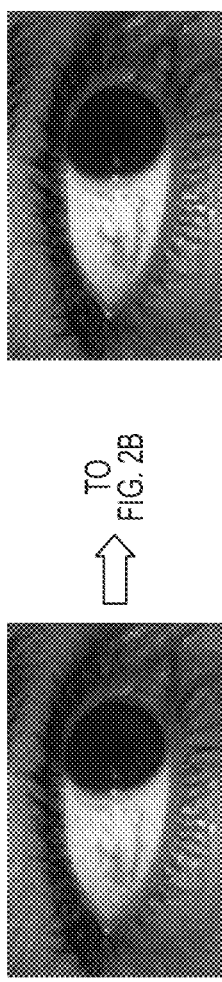
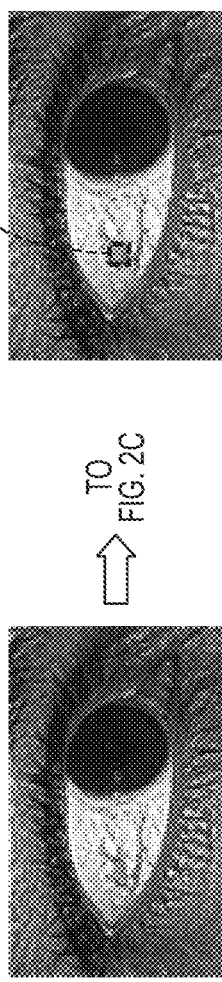
FIG. 2A  FIG. 2B  FIG. 2C  FIG. 2D  FIG. 2E

|   |   |   |
|---|---|---|
| 3 | 2 | 1 |
| 5 | 6 | 8 |
| 1 | 4 | 6 |
| 3 | 6 | 2 |
| 5 | 6 | 7 |

3x3 WINDOW AROUND PIXEL (with 4 on left, 0 on right)

|   |   |   |
|---|---|---|
| 3 | 2 | 1 |
| 1 | 1 | 1 |
| 0 |   | 1 |
| 0 | 1 | 0 |
| 5 | 6 | 7 |

LBP OF THE PIXEL

LONGEST ONES

START = 0
END = 3
OLBP = 1

| PIXEL POITION | GRAY CODE |
|---|---|
| 0 | 0000 |
| 1 | 0001 |
| 2 | 0011 |
| 3 | 0111 |
| 4 | 1111 |
| 5 | 1110 |
| 6 | 1100 |
| 7 | 1000 |

FIG. 7C

FEATURE EXTRACTION AND MATCHING
FOR BIOMETRIC AUTHENTICATION

CROSS REFERENCE TO RELATED
APPLICATIONS

This application is a divisional of Ser. No. 15/906,331, filed on Feb. 27, 2018, and entitled "Feature Extraction and Matching for Biometric Authentication," which is a continuation of U.S. patent application Ser. No. 15/259,902, filed on Sep. 8, 2016, and entitled "Feature Extraction and Matching for Biometric Authentication," which is a continuation of U.S. patent application Ser. No. 14/933,539, filed on Nov. 5, 2015, and entitled "Feature Extraction and Matching for Biometric Authentication," which is a divisional of U.S. patent application Ser. No. 14/274,385, filed on May 9, 2014, and entitled "Feature Extraction and Matching for Biometric Authentication," which claims the benefit of priority to U.S. Provisional Application Ser. No. 61/878,588, filed on Sep. 16, 2013, and entitled "Image Feature Detection, Authentication, and Information Hiding," each of which is incorporated herein by reference in its entirety.

TECHNICAL FIELD

The present disclosure generally relates to image comparison techniques for determining similarity between two images and, in particular, to biometric authentication based on images of the eye.

BACKGROUND

It is often desirable to restrict access to property or resources to particular individuals. Biometric systems can be used to authenticate the identity of an individual to either grant or deny access to a resource. For example, iris scanners can be used by a biometric security system to identify an individual based on unique structures in the individual's iris.

In a typical image-based biometric authentication system, one or more images are obtained from a person claiming to be an authorized user. Those images are compared with one or more reference images that are known to be provided by one or more authorized users. Only if the claimant-supplied images match well with one or more reference images, the claimant can be determined to be an authorized user. A match between two images, i.e., a measure of similarity between the two images, can be based on features of those images. The features can include a collection of one or more points of interest in the image, and descriptions of portions of the image surrounding such interest points.

SUMMARY

This specification describes technologies that are well suited for biometric authentication based on images of the eye. In particular, an image sharpening technique can aid in efficient feature detection. A Vascular Point Detection (VPD) technique can detect the points of interest from visible vasculature of the eye, and Pattern Histograms of Extended Multi-Radii Local Binary Patterns (PH-EMR-LBP) and/or Pattern Histograms of Extended Multi-Radii Center Symmetric Local Binary Patterns (PH-EMR-CS-LBP) can efficiently provide description of portions of images surrounding a point of interest of vasculature. The visible vasculature can be obtained using a scleral mask, which can be a binary image mask that includes white of the eye and excludes an image portion surrounding the white of the eye from an ocular image. Matching techniques described herein can improve the efficiency and/or accuracy of distance or correlation based matching by using outlier detection. The described techniques also allow for updating templates that are derived from reference images and are used for authentication (generally referred to as enrollment templates in the discussion below), so that the best quality and diverse images are used in authentication, e.g., to minimize naturally occurring variances in images captured at different locations and times.

In a feature extraction and pattern matching system, image sharpening can enable vascular point detection (VPD) for detecting points of interest from visible vasculature of the eye. Pattern Histograms of Extended Multi-Radii Local Binary Patterns and/or Pattern Histograms of Extended Multi-Radii Center Symmetric Local Binary Patterns can provide description of portions of images surrounding a point of interest, and enrollment and verification templates can be generated using points detected via VPD and the corresponding descriptors. Inlier point pairs can be selected from the enrollment and verification templates, and a first match score indicating similarity of the two templates can be computed based on the number of inlier point pairs and one or more parameters of a transform selected by the inlier detection. A second match score can be computed by applying the selected transform, and either or both scores can be used to authenticate the user.

An enrollment template can be a collection of interest points such as vascular points (VPD) and corresponding features such as Enhanced Multi-Radii Local Binary Patterns (EMR-LBP), Pattern Histograms of Enhanced Multi-Radii Local Binary Patterns (PH-EMR-LBP), Pattern histograms of Enhanced Multi-Radii Center-Symmetric Local Binary Patterns (PH-EMR-CS-LBP), and Enhanced Multi-Radii Center-Symmetric Local Binary Patterns (EMR-CS-LBP). In some implementations, an enrollment template can be created only if the acquired image exceeds a certain threshold based on ratio of VPD points to that of size of segmented scleral region. More than one enrollments are possible for a single user. Enrollment templates can be updated to accommodate behavioral and/or environmental variations affecting the acquired scans. Updating the enrollment templates using verification can be based on quality of a candidate verification template, match score, and/or other image and exposure similarity measures.

Accordingly, in one aspect, a computer-implemented method includes obtaining a sharpened image based on a number of captured images. One or more captured images can include images of a vascular structure. Moreover, the method includes detecting several vascular points in the sharpened image and, for each one of a number of detected vascular points, generating a one or more different local image descriptors. The method also includes generating a template that includes one or more of the detected vascular points and their respective local image descriptors. Other embodiments of this aspect include corresponding systems, apparatus, and computer programs.

In one implementation, obtaining a particular sharpened image includes selecting one or more images from the several captured images and averaging the selected images to generate an average image. The method also includes convolving the average image with a Laplacian of Gaussian (LoG) kernel to obtain a convolved image, and subtracting each pixel of the convolved image from a maximum pixel value, to obtain a difference image. In addition, this implementation of the method includes multiplying, in a pixelwise manner, the difference image and the average image, to obtain the particular sharpened image. In some implementations, instead of using a LoG kernel, computing the difference image and multiplying the difference image and the average image, a number of Gabor kernels oriented at different angles can be used for convolving the average image, so as to obtain the sharpened image directly.

In another implementation, the average image can be convolved with a set of even Gabor kernels to obtain the sharpened image. The set of even Gabor kernels that are oriented across various angles can be tuned based on several parameters, such as the resolution and scale of the input image, and average width of visible vasculature. This convolved image maybe used instead of, or in addition to, above mentioned LoG-based sharpened image.

In one implementation, detecting a number of vascular points includes selecting a point in the sharpened image as a candidate vascular point. Then, several (e.g., N where N is greater than one) first neighborhood points according to first window centered on the candidate vascular point can be identified. In addition, several (e.g., N) other second neighborhood points according to second, different window centered on the candidate vascular point can also be identified. In this implementation, the method further includes determining N states where N is greater than one. Each of the N states corresponds to one neighborhood point in the N points of the first neighborhood of points. A state can be determined by performing a comparison based on, at least in part, respective intensities of one of the first neighborhood points, i.e., one of the N points according to the first window, a corresponding point of the second neighborhood, i.e., one of the N points according to the second window, and the candidate vascular point. The method can also include aggregating the N states, and designating the candidate vascular point as a vascular point based on, at least in part, a value of the aggregated states.

In some implementations, a geometric distance between the candidate vascular point and a first neighborhood point in the first window is less than a geometric distance between the candidate vascular point and a first neighborhood point in the second window, where the first neighborhood point in the second window corresponds to the first neighborhood point in the first window. The comparison can include testing if an intensity of the point in the first neighborhood of N points is greater by a first threshold than an intensity of the candidate vascular point. Alternatively, or in addition, the comparison can include testing if an intensity of the corresponding point in the second neighborhood of N points is greater by the first threshold than the intensity of the candidate vascular point. Determining a corresponding state can include setting the state to a first value (e.g., a logical high value or "1") if any of the two tests is true, and setting the state to a second value (e.g., a logical low value or "0"), otherwise. In one implementation, aggregating the N states includes summing the N states, and designating includes testing if a summed value of the aggregated states exceeds a selected count. The selected count can be N or, in some implementations, can be less than N.

Another comparison can include testing whether the intensity of any point in the first neighborhood of N points is greater than a second threshold, and/or testing whether the intensity of the corresponding point in the second neighborhood of N points is greater than the second threshold. Determining the corresponding state can include setting the state to a second value (e.g., a logical low value or "0") if any of the two tests is true.

In some implementations, the method includes performing the selecting, identifying, determining, aggregating, and designating for a number of points in the sharpened image, and setting each candidate vascular interest point designated as a vascular point to a first value (e.g., a logical high value or "1") and setting other candidate vascular interest points to a second value (e.g., a logical low value or "0"), to obtain a binary vascular map (BVM) representing veins. The BVM can be thinned by excluding at least one vascular point that: (i) corresponds to the boundaries across the width of a vasculature, and (ii) was set to the first value. The method can also include locally suppressing one or more vascular points that were set to the first value. The local suppression can be based on, at least in part, a gradient magnitude map relating to a portion of the sharpened image or relating to the entire sharpened image.

In some implementations, generating the respective one or more local image descriptors includes computing at least one of: (i) a pattern histogram of extended multi-radii local binary patterns (PH-EMR-LBP) of an image region surrounding the detected vascular point, and (ii) a pattern histogram of extended multi-radii center-symmetric local binary patterns (PH-EMR-CS-LBP) of an image region surrounding the detected vascular point.

In another aspect, a computer-implemented method for matching one or more verification templates with one or more enrollment templates includes identifying a number of matching point pairs. Each matching point pair includes a first point from a particular verification template and a corresponding second point from an enrollment template. Each first point includes: (i) a location of a point of interest in a verification image corresponding to the verification template, and (ii) a number of different types of descriptors, each one describing a locality surrounding the point of interest in the verification image. Each second point includes: (i) a location of a point of interest of an enrollment image corresponding to the enrollment template, and (ii) a number of different types of descriptors, each one describing a locality surrounding the point of interest in the enrollment image.

The method also includes obtaining several inlier point pairs selected from the a number matching point pairs by performing outlier detection across the verification and enrollment templates. In addition, the method includes calculating a match score based on the several inlier point pairs (e.g., a stage 1 match score), using a geometric transformation identified during outlier detection as part of pre-processing (e.g., in computing a stage 2 match score), or both. Other embodiments of this aspect include corresponding systems, apparatus, and computer programs.

In one implementation, identifying the several matched point pairs includes, for each first point in the verification template, calculating respective distances between the descriptors associated with the first point and descriptors associated with one or more of the second points of the enrollment template. One of the second points can be designated as corresponding to the first point based on the respective distances and, thus, a match point pair that includes the first point and the corresponding second point is identified.

Calculating a respective distance between the descriptors associated with a particular first point in the verification template and descriptors associated with a second point of the enrollment template can include calculating a distance between each descriptor associated with the particular first point and each corresponding descriptor of the second point of the enrollment template. The calculated distances can be combined as a weighted average to obtain the distance between the descriptors associated with the particular first point and the descriptors associated with the second point of the enrollment template.

In one implementation, identifying the several matching point pairs according to a voting method includes, for each first point in the verification template, calculating respective distances between each of the descriptors associated with the first point and a corresponding descriptor associated with one or more second points of the enrollment template. A number of distances not exceeding respective distance thresholds can be counted, and one of the second points can be designated as corresponding to the first point based on the count of the number of distances. Thus, a match point pair including the first point and the corresponding second point is generated.

In various implementations, calculating respective distances can be calculated as a Hamming distance, a Euclidean distance, a Manhattan distance, a correlation, or a Mahalanobis distance. In some implementations, the local (non-binary) descriptors can be shortened using principal component analysis (PCA) to eliminate dimensions that do not contribute to local descriptor variances. A particular descriptor can be derived using Extended Multi-Radii Local Binary Patterns (EMR-LBP), Histograms of Extended Multi-Radii Local Binary Patterns (H-EMR-LBP), Patterned Histograms of Extended Multi-Radii Local Binary Patterns (PH-EMR-LBP), Extended Multi-Radii Center Symmetric Local Binary Patterns (EMR-CS-LBP), Histograms of EMR-CS-LBPs (HCS-LBP), Pattern Histograms of EMR-CS-LBPs (PH-EMR-CS-LBP), Histograms of Oriented Gradients (HoG), Speeded Up Robust Features, (SURF) or Fast Retina Keypoint (FREAK). Obtaining the several inlier point pairs can include using random sample consensus (RANSAC), M-estimator sample and consensus (MSAC), or GROUPSAC, to align the first points to the corresponding second points.

In some implementations, calculating the match score includes computing correlation of detected inlier points' locations from the matched first points and corresponding second points. Computing the first match score also includes additional parameters and procedure besides location correlation such as number of the inlier point pairs and one or more parameters of the aligning geometric transformation. A parameter of the geometric transformation can be a change in scale of the verification image as a result of the calculated geometric transformation from inlier point pairs or a change in angle of the verification image as a result of the geometric transformation from inlier point pairs. In one implementation, both parameters are used in computing the first match score. In other implementations, depending on the transformation type, additional parameters such as shear maybe used. Other computed measures of the geometric transformation showing its deviation from the genuine distribution are also acceptable. In some implementations, the method includes, prior to identifying the candidate (inlier) points, modifying the averaged verification image via Gabor filtering. The enrollment template can also be modified via Gabor filtering.

In some implementations, computing the match score includes computing a second match score by applying the geometric transformation to the verification image to create a transformed image. The method also includes filtering the transformed image and encoding the oriented local binary pattern versions of the transformed image, and applying the same process to the image used for the enrollment template. Each version can include a number of layers wherein each layer corresponds to a distinct dimension of the encoding. The method can further include comparing one or more corresponding tiles in each layer of the encoded transformed image and the encoded image corresponding to the enrollment template, to obtain a respective layer measure for each layer. The layer measures can be aggregated to obtain the second match score. The filtering can include Gabor filtering or logarithm of Gabor filtering, and the encoding can include Gray coding.

In some implementations, the method includes excluding, prior to comparing, one or more tiles corresponding to a region substantially lacking visible vasculature. Comparing corresponding tiles can include calculating a Hamming distance, a normalized Hamming distance, or a sliding window correlation between the corresponding tiles. The method can further include computing a first match score in addition to the second match score. The first match score can be computed by computing a correlation between coordinates of the two corresponding points, from the verification and enrollment templates, respectively, of the inlier point pairs, and can be based on parameters such as a number of the inlier point pairs and one or more parameters of the geometric transformation, and/or be based on a function of the number of inlier point pairs. The match score can then be computed as a weighted sum of the first match score and the second match score.

In one implementation, the correlation for first match score includes computing $$\frac{Cx + Cy}{2},$$

where the coordinates of the inlier points across the verification and enrollment templates include the X and Y coordinates of each point in the pairs, and Cx and Cy are correlations of the X and Y coordinates, respectively, of inlier matched points across the verification and enrollment templates. The Stage 1 match score can be computed as:

$$\frac{\left(\frac{Cx+Cy}{2}\right)*\log_2(N)}{(1+|\log_2(RS+0.001)|)*\left(1+\left(\frac{RA}{0.2}\right)^2\right)}$$

In this computation, N is the number of the inlier point pairs, RS is a change in scale of the verification image as a result of the calculated registration geometric transformation, and RA is a change in angle of the verification image as a result of the calculated registration geometric transformation. The method can further include excluding the first match score from the match score if at least one parameter of the geometric transformation lies outside a nominal range of that parameter. RS and RA can be augmented by shear when affine transformation is assumed. The first stage match score, in terms of a function of Cx, Cy, N, and the transformation matrix-derived parameters, can also be directly learned using labeled dataset of impostor and genuine comparisons to train a classifier such as an artificial neural network or linear discriminant analysis. Optionally, a PCA preprocessing stage maybe applied before classification.

In some implementations, instead of transformation-matrix-derived parameters RS and RA, another function of the transformation can be directly calculated from the its matrix elements. Considering the transformation matrices derived from genuine and impostor comparisons, it is desired to create a function of corresponding transformation matrix elements yielding maximum genuine-impostor separation in its distribution. One way to achieve this end is to use the transformation matrices of a labeled dataset of impostor and genuine comparisons to train a regression function and maximize a measure of classifiability, such as Fisher discriminant ratio.

In another aspect, a computer-implemented method for updating enrollment templates includes receiving a verification template that includes several points of interest. Each point of interest is associated with a number of different respective descriptors that each describes one or more localities surrounding the corresponding point of interest. The method also includes computing a match score for the verification template by comparing the verification template with one or more enrollment templates in a collection of enrollment templates. The verification templates can be added to the collection of enrollment templates based on, at least, the match score matching or exceeding an enrollment threshold.

In some implementations, the method includes, for each template in the collection of enrollment templates, generating a respective match score with one or more other templates in the collection of enrollment templates. A respective median match score is computed for the template, and a template having a minimum median match score can be removed from the collection of enrollment templates. Other embodiments of this aspect include corresponding systems, apparatus, and computer programs.

In some implementations, the method may include generating quality score for enrollments using thinned BVM and the scleral mask. The scleral mask can be a binary image mask that includes white of the eye and excludes an image portion surrounding the white of the eye from an ocular image. Quality score may be the ratio of number of detected vascular points in thinned BVM to number of true pixels (1's) in scleral mask. The method also includes removing enrollment templates which do not pass a certain quality score.

In some implementations, the method includes adjusting the match score according to an exposure difference, an influence threshold, or both. The exposure difference can include a difference between a verification exposure template associated with the verification template and an enrollment exposure template associated with the enrollment template. The method can also include generating the verification exposure template and/or the enrollment exposure template.

In some implementations, generating an exposure templates (for enrollment and/or verification) includes partitioning an ocular region of interest (ROI) corresponding to the enrollment and/or verification images into two or more sections, and generating for each section a histogram of intensities representing for each intensity in the histogram, a number of pixels in the section of the ROI having substantially that intensity. The ROI can be an area of the image centered on the eye. In some implementations, this area is found by an eye finder. In some implementations, the ROI is found by cropping an image of an eye according to a bounding box of a scleral mask and by padding the cropped image with a specified number of pixels (e.g., 50 pixels). In one implementation, the ROI is partitioned into four quadrants. In some implementations, an image of an eye can be cropped using a bounding box from one eye corner to another eye corner and from one eye lid to another eye lid. The cropped image can be padded with a specified number of pixels.

In one implementation, the exposure difference is $-1$ times an exposure similarity. The method includes determining for each quadrant j: one or more of (i) a normalized absolute value of a histogram differences (ABSNdist_j), (ii) a histogram intersection similarity (INTRsim_j), (iii) a correlation coefficient similarity of histograms (CORRsim_j), and (iv) a Bhattacharyya distance (BHATdist_j). The exposure similarity can be computed as:

$$(-\Sigma_j ABSNdist\_j - \Sigma_j BHATdist\_j + \Sigma_j INTRsim\_j + \Sigma_j CORRsim\_j).$$

Other linear or nonlinear combinations of the above four metrics are possible.

In one implementation, generating one or more exposure templates includes generating a number of exposure measures. Each one of the exposure measures can be an exposure metering of the ROI included in EXIF file of the image (EXIF measure), a statistical parameter of a Y component of a YUV image, and a statistical parameter of a G component of an RGB image.

In some implementations, an exposure difference and/or an exposure similarity is computed based on one or more histogram measures. The different histogram measures can be any one of: a normalized absolute value of a histogram differences (ABSNdist), a histogram intersection similarity (INTRsim), a correlation coefficient similarity of histograms (CORRsim), and a Bhattacharyya distance (BHATdist).

In some implementations, the method may include, prior to computing the match score, ordering the collection of enrollment templates according to respective exposure differences between a verification exposure template associated with the verification template and each enrollment exposure template associated with each enrollment template in the collection of enrollment templates. As such, the verification of the verification template can be expedited because generally the verification proceeds by comparing a verification template with several enrollment templates, but starting with those that have lowest exposure difference and, thus, more likely to correctly match the verification template.

BRIEF DESCRIPTION OF THE DRAWINGS

FIGS. 2A-2D illustrate an example image sharpening to aid vascular point detection and local image descriptor generation.

FIGS. 2E and 2F illustrate an example vascular point detection procedure.

FIGS. 7A-7C illustrate generating Gray coded OLBP patterns corresponding to an example pixel window.

Like reference numbers and designations in the various drawings indicate like elements.

DETAILED DESCRIPTION

Figure 1A:
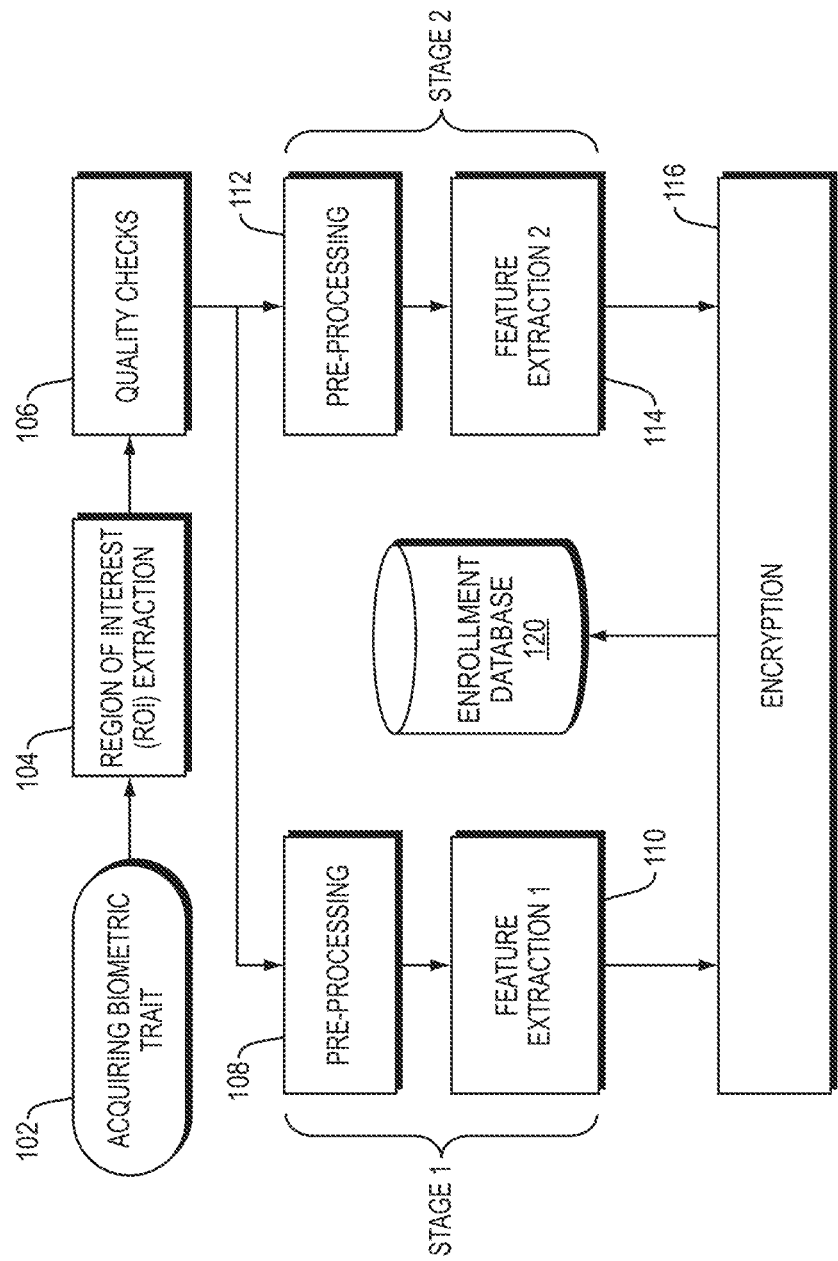
FIG. 1A schematically depicts an example two-stage system for generating enrollment templates.
Figure 1B:
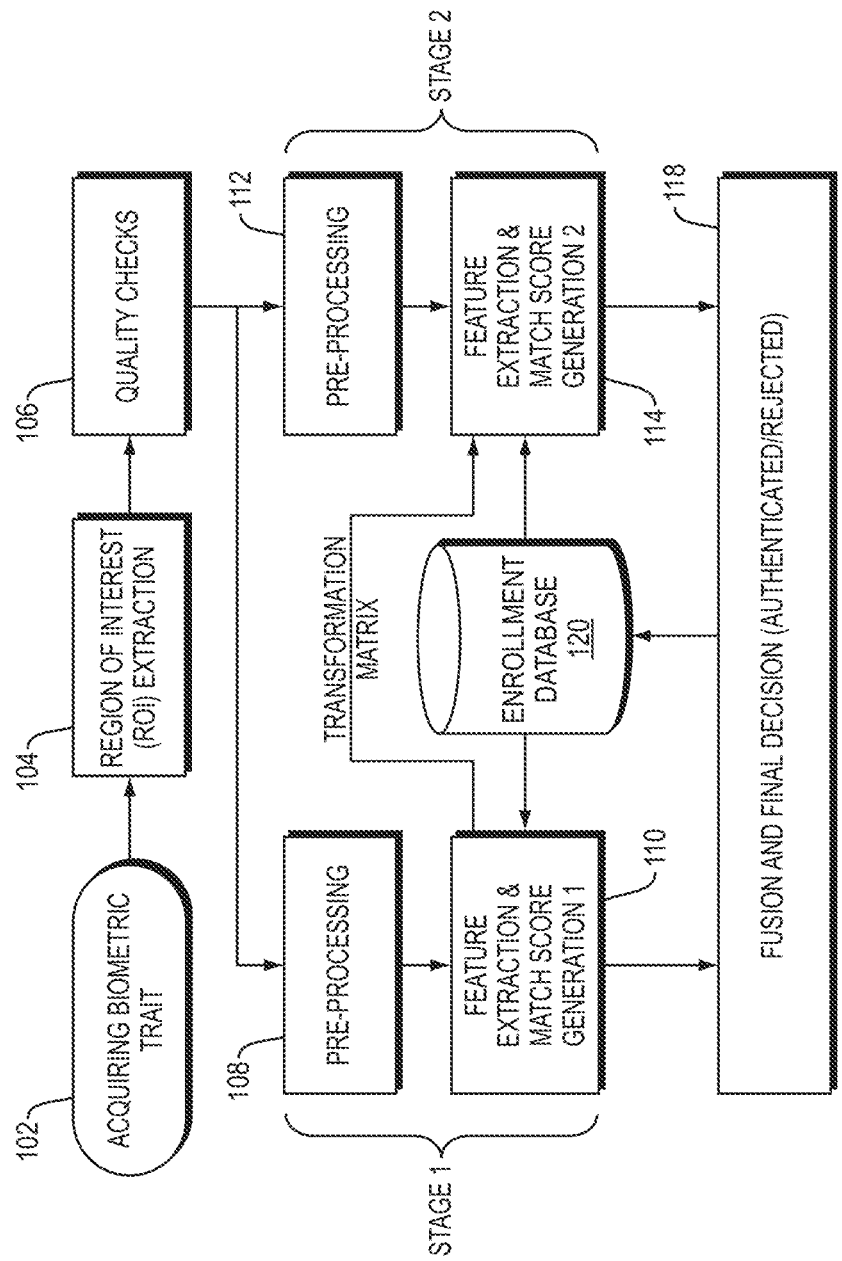
FIG. 1B schematically depicts an example two-stage system for generating a verification template and comparing that template with an enrollment template, thereby determining the similarity between the two images corresponding to the two templates.

FIGS. 1A and 1B schematically depict an example multi-stage biometric system for generating and storing enrollment templates of visible vasculature that can be used for user authentication. In one implementation, the visible vasculature corresponds to the vasculature seen in the white of the eye. The white of the eye has a number of layers. The sclera is an opaque, fibrous, protective, layer of the eye containing collagen and elastic fiber. The sclera is covered by the conjunctiva, which has a particularly large number of blood vessels and veins that that run through and over it. The episclera is covered by the bulbar conjunctiva, which is a thin clear membrane that interfaces with the eyelid or the environment when the eyelid is opened. Blood vessels (vasculature, in general) run through all of these layers of the white of the eye and can be detected in images of the eye. During user authentication, one or more images of a user's eye are captured, one or more verification templates are generated from the captured image or images, and the identity of the user can be verified by matching the corresponding vascular structures as expressed in the enrollment and verification templates.

It should be understood that the systems and methods described with references to FIGS. 1A and 1B are not limited to eye vasculature. For example, biometric authentication can be performed using vasculature of the ear. In particular, using a near infrared camera (for instance if one is implemented near earpiece of a phone) and an infrared light source, images of the ear vasculature can be obtained and user authentication using those images can be performed as described herein.

In step 102, images of a user's eyes are captured using an image sensor, e.g., a camera, that is associated with a device to which access by the user is to be authenticated (e.g., a smart phone, a smart watch, smart glasses, a notebook computer, a tablet computer, etc.). By way of illustration, the camera can be a digital camera, a three-dimensional (3D) camera, or a light field sensor. In some implementations, the camera can be an inward facing module in a wearable device with a spectacle form factor, and used to capture images of the user's white of the eye for biometric authentication. The images can be captured either in still mode or in video mode. In some implementations, the user may be prompted (by visual, or audible, or haptic feedback) to look to the left or right or up or straight while the image is captured. Looking to the left or right can expose a larger area of the white of the eye to the right or left of the iris for data capture, while looking straight can provide two smaller segments of the white of the eye to the left and right of the iris in each eye. In step 104, a general region of interest is identified, e.g., one or both eyes may be located. To this end, Viola-Jones algorithms trained on different glancing eye images can be used. Thereafter a gaze tracking algorithm such as that using Haar filters can be used to quantize the amount of gaze to acquire one or more images, once a selected gaze direction is detected. Typically, the acquired images are cropped to obtain RGB images of one or more eyes. Hereafter, "image" or "captured image" generally refers to a cropped RGB image of an eye.

The images that are captured from an image sensor can have varying quality due to, for instance, exposure and motion blur artefacts. In optional step 106, several images can be registered (i.e., spatially aligned) and averaged to reduce image noise. In some implementations, image correlation methods are used to measure the dissimilarity between the obtained images in order to align the images for averaging and discard those that are most different (e.g. due to motion blur or eye blink) and, hence, are not suitable for registration and averaging. For example, four images captured in sequence can be averaged after registration if the images are not too different. The number of images that are averaged can depend on the frame rate and noise level of the image sensor. When several averaged images are generated, a quality metric can be used to select the highest-quality for use in subsequent steps. In some implementations, standard deviation of the pixel values of the green channel of a sharpened image (derived as described below) can be used as a quality metric. Other quality metrics are possible.

The images produced by the quality check step 106 are used to produce templates for a two-stage matcher, after which the original images are usually discarded for security and privacy reasons. A stage 1 template can include a number of (interest point, feature vectors) elements. A stage 2 template can include encoded (e.g., Gray coded) oriented local binary patterns (OLBP) corresponding to the original images. In an enrollment mode (described below), one or more captured images are designated as enrollment images and enrollment templates are generated therefrom. In some implementations, corresponding exposure templates based on local histograms of exposure profiles of the captured images are generated and stored. In an authentication/verification mode (also described below), one or more captured images are designated as verification images, and verification templates are generated therefrom to match against enrollment template.

With reference to FIG. 1A, in Stage 1, one or more averaged images, which can be enrollment images or verification images, are preprocessed at step 108, and features from the preprocessed images are extracted at step 110, to generate one or more Stage 1 templates. In Stage 1, the preprocessing can include image sharpening or Gabor filtering, and the feature extraction can include vascular point detection (VPD) and feature descriptors (PH-EMR-LBP, PH-EMR-CS-LBP, SURF, EMR-LBP, HoG and FREAK), and their PCA preprocessing, all of which are described in detail below. In Stage 2, one or more averaged images are preprocessed at step 112, and features from the preprocessed images are extracted at step 114, to generate one or more Stage 2 templates. In Stage 2, the preprocessing can include Gabor filtering and the feature extraction can include detection of oriented local binary patterns (OLBP), for example. The enrollment templates, prior to storing, can be encrypted at step 116.

In the verification mode, i.e., when verification images are processed, Stage 1 at step 110 includes identifying candidate interest points and feature descriptors that are matched with enrollment template to derive a geometric transform (e.g., a affine transformation, or self-similarity transformation) from detected inliers and computing a first match score based on one or more parameters of the identified transform and inlier coordinates. In Stage 2 at step 114 includes transforming the preprocessed verification image using the identified geometric transformation, Gabor filtering and phase thresholding, and encoding the result with OLBP to get the stage 2 verification template, and computing a second match score using correlation of the tiled OLBP layers of verification and enrolled templates. More than one first match score can be computed by repeating the step 110, each repetition corresponding to a different geometric transform that is identified in that repetition. The one or more first match scores and the second match score can be combined in step 118 (FIG. 1B), and the verification image or images can be determined to be authentic based on the combined score. In some implementations only the first match score or scores are used in determining authenticity while in other implementations, the first match score may be discarded based on one or more parameters of the corresponding geometric transformation. In some implementations, more than one first and second match scores can be computed by repeating the steps 110 and 114. The one or more first match and second match scores can be combined in step 118 (FIG. 1B), and the verification image or images can be determined to be authentic based on the combined score. In some implementations, the combination rule can be the max rule, the product rule, or the sum rule. In some implementations, the combination rule can be a linear mixture determined by linear discriminant analysis.

Specifically, as depicted in FIG. 1B, Stage 1 processing and analysis includes determining correlation between corresponding locations in enrollment and verification templates, comparing image descriptors of the enrollment and verification templates that describe localities surrounding detected points of interest in images corresponding to those templates to find a spatial correspondence of the points of interest, and rejecting outlier points of interest. At this stage, a registration transformation matrix, plus a match score is produced. The transformation matrix can be used to register the incoming verification images for the Stage 2 matcher. In some implementations, Stage 1 match score is used by itself to make a decision as to whether the verification image is authentic without proceeding to Stage 2. In some implementations, if stage 1 fails to compute or fails to provide a registration matrix within the acceptable scale, rotation, and/or shear limits, stage 2 may proceed to produce a match score on its own using no or an auxiliary registration matrix provided by, for instance, step 104, based on the boundaries of the iris within the ROI.

Image Sharpening

In some implementations, preprocessing (step 108) can be used to enhance the visibility of vasculature in the captured images. One such method is selecting a color component from the RGB image data that can maximize the contrast between vasculature and surrounding white of the eye. In some implementations, this image can include of a linear combination of blue and green layers. Specifically, in one implementation, each averaged image is sharpened to obtain a corresponding sharpened image using a three-step process. The first step includes convolving the pixel values of green channel or part of the blue and green channels of an averaged image derived from one or more captured images with a Laplacian of Gaussian (LoG) kernel, to obtain a convolved image. The second step includes subtracting the LoG filtered image from the maximum value attainable in the image.

Finally, in the third step each pixel of the processed image obtained from the second step is multiplied with the corresponding pixel of the averaged image, to obtain a sharpened image. FIG. 2A, for example, depicts an averaged image of an eye obtained from one or more captured images. FIG. 2B depicts the corresponding green channel, and FIG. 2C depicts the corresponding LoG filtered image. The standard deviation of the sharpened imaged obtained in the third step can be the image quality metric used in sorting a sequence of averaged images and selecting an averaged image for further processing. In one implementation, a LoG kernel used for sharpening can be expressed as:

$$LoG\ Kernel = -\frac{1}{\pi\sigma^4}\left(1 - \frac{x^2 - y^2}{2\sigma^2}\right)\exp^{-\frac{x^2-y^2}{2\sigma^2}}$$

where the filter kernel size is 5×5 pixels with a Gaussian standard deviation (σ) of 0.4. Parameters of the LoG filtering can be optimized based on the resolution of the acquired image. The above example parameters were selected for a cropped eye image having approximate dimensions of 100× 110 pixels (±20 pixels). The number of retained quality sorted sharpened averaged images can vary according to the application. For example, if the application is generating and storing enrollment templates, the top four sharpened averaged images may be retained. A different number of images, such as two, may be retained if the application is at the verification stage.

In some implementations, in addition to the LoG-based image sharpening, another enhanced copy of the averaged image can be obtained by convolving with bank of Gabor filters defined by:

$$G_{even}(x, y, f, \theta) = \exp\left\{\frac{-1}{2}\left[\frac{x'^2}{\sigma_x^2} + \frac{y'^2}{\sigma_y^2}\right]\right\}\cos(2\pi f x')$$

$$G_{odd}(x, y, f, \theta) = \exp\left\{\frac{-1}{2}\left[\frac{x'^2}{\sigma_x^2} + \frac{y'^2}{\sigma_y^2}\right]\right\}\sin(2\pi f x')$$

where x'=x sin(θ)+y cos(θ) and y'=x cos(θ)−y sin(θ)
σx and σy define the standard deviation of the Gaussian envelope along x-axis and y-axis respectively, f is the frequency of the modulating sine or cosine, and θ is the orientation angle of the kernel, varied 6 times, from 0 to 5π/6, each π/6 radians apart. The resulting six filters are used for aforesaid image enhancement. In some implementations, only the magnitude of the odd or even part of the Gaussian filter bank may be used. In some implementations, f is 0.22 and $\sigma_x=\sigma_y=1.9$. These values can change with the resolution of the ROI. In one implementation, only even Gabor filters are used to enhance averaged image.

In some implementations, additional preprocessing of the sharpened averaged images includes image histogram and contrast adjustments such as Contrast Limited Adaptive Histogram Equalization (CLAHE). CLAHE generally operates in small regions of the image called tiles. Typically, each tile's contrast is enhanced such that the histogram of the output approximately matches the histogram specified by a particular distribution (e.g., uniform, exponential, or Rayleigh distribution). The neighboring tiles are then combined using an interpolation (e.g. bilinear interpolation) to eliminate any artificially induced boundaries. In some implementations, the image region can be enhanced by selecting a linear or nonlinear combination of the red, green, or blue color components that has the best contrast between the vessels and the background. For example, the green component can be preferred in a RGB image of the eye, because it can provide the best contrast between vessels and the background. In some implementations, green and partial blue pixel values can be used. In some implementations, CLAHE preprocessing is not used. A Region of Interest (ROI) can be selected from the averaged image prior to the three-step sharpening, for example, by applying a scleral mask. A check can be used to ensure the soundness of the selection of the ROI. For example, if the area selected by applying the scleral mask is not at least a certain specified percentage (e.g., about twenty five percent of the averaged image size), the corresponding image is removed from further processing.

Vascular Point Detection

Various point detection algorithms can be used to identify salient or interest points within a region of interest (step 104). Salient or interest points are typically where potentially identifiable vascular or otherwise specific patterns of interest generally occur. Some known techniques that can be employed for interest point detection include the Speeded Up Robust Features (SURF) algorithm, Accelerated Segment Test (FAST) algorithm, and Harris and Stephens (HS) algorithm. These generic techniques often do not detect most/all the points on the vascular patterns within an image region. Therefore, in some implementations, a Vascular Point Detection (VPD) algorithm is used. The VPD is a point finder that tends to find points that are centered/located on vessel-like objects. The VPD algorithm considers distal neighborhoods of a potential interest point (pixel) of an intensity image to determine if that point is located on an object of interest, e.g., a vessel in a vascular pattern. The VPD algorithm can be adjusted based on, for example, the scale and resolution of an image, pixel intensity dynamics, and a specified point detection sensitivity, among other factors.

Figure 2F:
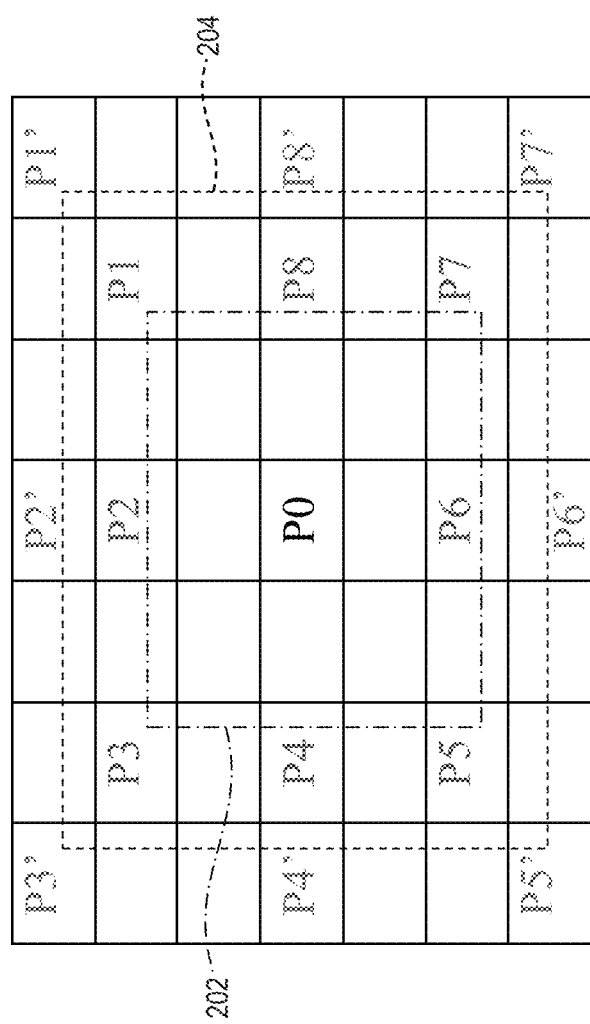

In one implementation of the VPD algorithm a region of an image is selected, as depicted in FIG. 2D. Various distal neighborhood points, as depicted in FIG. 2E are considered for VPD calculations. With reference to FIG. 2F, in an example pixel neighborhood centered on an interest point candidate P0 two pattern windows 202, 204 are identified. In some implementations, additional pattern windows can be embedded within each pixel neighborhood. Each pixel neighborhood is laid on potential point of interest (e.g., P0). The sizes of the two pattern windows 202, 204 are different. In one implementation, shown in FIG. 2F, the first pattern window is a 5×5 pixel kernel which includes points P1 through P8, while the second pattern window is a 7×7 pixel kernel which includes points P1' through P8'. Each pattern window includes eight peripheral pixels that are used for computations described below.

To determine whether the center point P0 is a point of interest, the VPD calculates the difference in intensities between candidate pixel (P0) and 16 other pixels (i.e., P1-P8 and P1'-P8') in the neighborhood of the pixel P0. Each comparison is considered to be a state and each state is defined as:

$$Si=((Pi-P0)>t)\|((Pi'-P0)>t)$$

Specifically, the intensity of P0 is compared with intensities of corresponding edge pixels Pi and Pi'. If the difference between the intensities of P0 and Pi exceeds an intensity threshold t, or if the difference between the intensities of P0 and Pi' exceeds the intensity threshold t, the state is set to a high logical value (e.g., "1"). Otherwise, the state is set to a low logical value (e.g., "0"). The intensity threshold t can be changed based on the quality of images and the amount of noise in the images. In this example, a maximum counter value is eight, as there are eight comparisons. If the sum of all eight states exceeds a certain count, e.g., 6, the candidate point is labelled or designated as a vascular point.

In some implementations, if an intensity value of any pixel in a window is greater than a second intensity threshold, the center point can be discarded from further analysis. In this situation, the pixel may represent an area of the image where aberrations, glare, or other image artifacts may lead to a faulty identification of a candidate point. For example, if a second intensity threshold is 240, where the maximum intensity of 256, and if the intensity of an edge pixel exceeds 240, the corresponding center pixel is discarded from a pool of potential VPD candidate points.

Figure 3A:
FIGS. 3A-3C depict, respectively, an example binary image of detected vascular points from an eye, a corresponding thinned binary image, and an overlay of the thinned and the original binary images.

The values provided above are example values, and other values can be used. For example, more than two windows can be used, the sizes of either or both windows can be different than those in this example, and the threshold values and intensity scale can also be adjusted based on various factors. For example, an image with relatively low resolution can use two small pixel windows, such as one 3×3 window and one 5×5 window, while a relatively high resolution image can use three larger pixel windows, such as one 7×7 window, one 9×9 window, and one 11×11 window. The VPD process can be used on all pixels of an image region, or a subset of pixels, such as each pixel within a particular distance from the border of the image region. In general, the VPD is a local neighborhood operation and a sliding window technique can be employed in determining the states as described above and in deciding whether a candidate point is a vascular point. As such, the VPD binarizes the ROI of an eye by assigning to all points determined to be vascular points a logical high value (e.g., "1"), and by assigning to all other candidate points a logical low value (e.g., "0"). The resulting binary mask is referred to as Binary Vascular Map (BVM) as depicted in FIG. 3A.

Figure 3B:
Figures 3C, 4A, 4B:
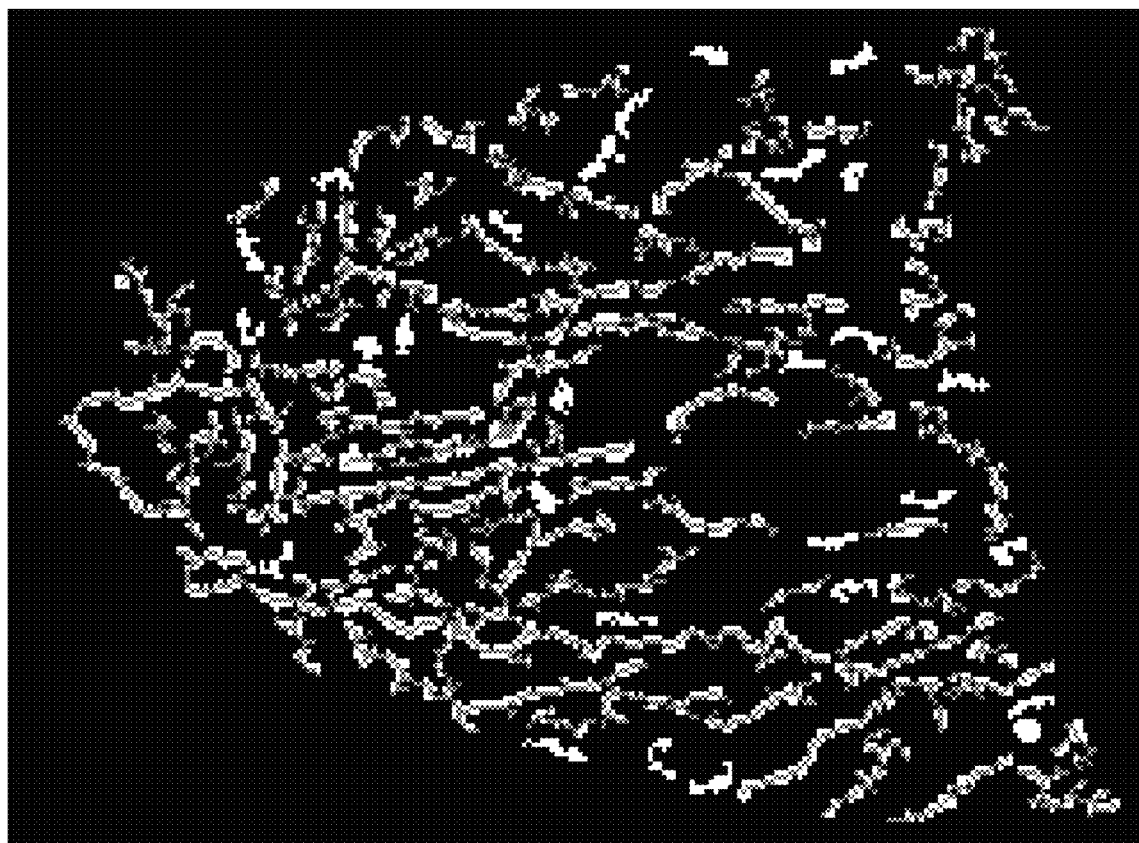
FIGS. 4A and 4B depict example masks used to sparse a thinned binary image representing detected vascular points.

In a BVM, all blobs that are less than a predefined number of pixels in size can be removed by considering them to be non-vascular points. In some implementations, each individual connected vascular structure (blob) obtained from a BVM can be thinned, resulting in a thinned Binary Vascular Map or thinned BVM, as depicted FIG. 3B. The thinning process creates a vascular trace traversing through the center of vasculature. An overlay of an example thinned BVM on a corresponding BVM is shown in FIG. 3C.

In some implementations, in order to further reduce the number of vascular points, a local point suppression can be applied. In general, local suppression is based on gradient magnitude map obtained from a gray scale sharpened image of an ROI. The gradient magnitude map can be obtained by convolving a Sobel filter with the gray scale image to emphasize edges. The Sobel operator generally convolves the ROI image with 3×3 horizontal and vertical gradient kernels to yield gradient magnitude mask. Example gradient kernels are shown in FIGS. 4A and 4B.

Figure 4C:
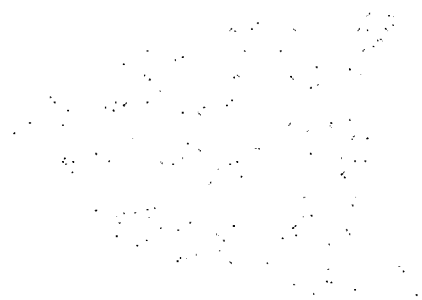
FIG. 4C depicts a sparse binary image corresponding to the thinned binary image depicted in FIG. 3C.
Figure 5B:
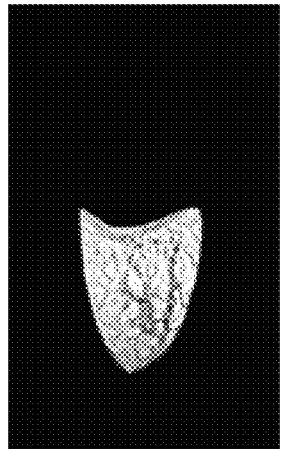
FIGS. 5A-5C respectively depict an example original image of an eye, an example region of interest (ROI) mask, and the ROI from the original image.
Figure 5C:
Figure 5E:
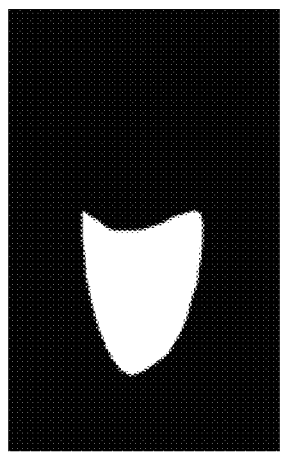
FIGS. 5D-5F respectively depict a binary vascular map (BVM) corresponding to the ROI depicted in FIG. 5C, a corresponding thinned BVM, and a corresponding sparse BVM, each of which is overlaid on the original image depicted in FIG. 5A.
Figure 5F:
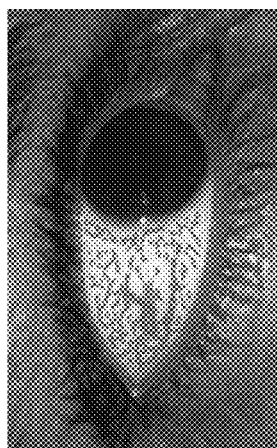
Figure 5A:
Figure 5D:
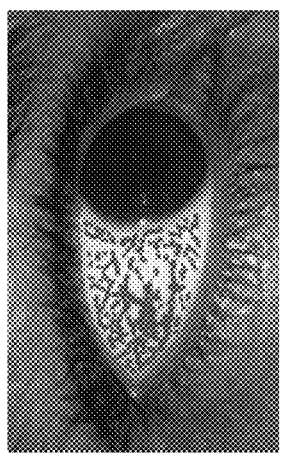

In one implementation, a thinned BVM is divided into neighborhoods of 5×5 non-overlapping blocks. In each block, if any thinned BVM points are present, only one vascular point that maps to highest gradient value in the corresponding gradient magnitude mask is chosen. This process of local suppression reduces the number of vascular points by almost half, thus reducing the template size and aiding the process of matching. The reduced set of interest points is referred to as "sparse VPD points" hereafter. An example set of sparse VPD points corresponding to the example BVM depicted in FIG. 3B is shown in FIG. 4C. The 5×5 neighborhood is illustrative only, and can be changed based on the image resolution and scale. FIGS. 5A-5F depict an example original image, an example ROI mask, the ROI from the original image, a BVM corresponding to the ROI overlaid on the original image, a corresponding thinned BVM overlaid on original image, and a corresponding sparse BVM (also called sparse VPD) overlaid on the original image.

In one implemetation, candidate points from other point finders such as FAST, HS, and SURF can be added to the sparse VPD set of points, provided that they satisfy a minimum distance threshold. For example, in one implementation, FAST points are added to the sparse VPD points if the FAST points are at least 3 pixel away from the VPD points. In some implementations, interest points can be derived from all or a subset of the above-described interest point finders. In some implementations, interest points can be identified at multiple scales. For example, interest points can be detected from a three stage Gaussian image pyramid. Other multi-scale image decompositions are possible.

Local Image Descriptors

After interest points are identified using one or more point detection algorithms described above, a set of one or more local image descriptors can be obtained from the ROI localities surrounding each candidate point (step 110). These local image patch descriptors can be generated using a variety of algorithms such as histograms of oriented gradients (HoG) and Speeded Up Robust Features (SURF) which builds upon SIFT descriptors but with better computational efficiency using through Haar wavelets and integral images. Local image descriptors can also be computed using a binary local image descriptor algorithm called Fast Retina Keypoint (FREAK). Extended Multi-Radii Local Binary Pattern (EMR-LBP) and Pattern Extended Multi-Radii Center-Symmetric Local Binary Patterns (PEMR-CS-LBP) are two other binary image feature extractors. In general, these techniques are not optimized for eye vein matching.

Pattern Histograms of EMR-LBP (PH-EMR-LBP) and Pattern Histograms of EMR-CS-LBP (PH-EMR-CS-LBP) as feature descriptor algorithms, described in further detail below, are customized for eye-vein matching. Each of these techniques can be used individually, in combination, and/or in combination with other feature descriptor algorithms described above to generate several image descriptors around each interest points of an ROI.

Generally, the LBP descriptors are calculated around interest points as follows: it is assumed that the current interest point is at pixel location $(x_0,y_0)$. The intensity values of the immediate 8-neighbors of the center point $(x_0,y_0)$, $\{(x_i,y_i)\}$, i=1, 2, . . . 8), are compared to that of the center point and the results are stored in $K_i$. The intensity of a neighbor can be less or the same as the intensity of the center point, and the corresponding result can be a logical low value such as "0." If the intensity is greater, the result can be a logical high value such as "1." After the comparisons, and 8-bit code called LBP8 for $(x_0,y_0)$ is obtained as $$LBP8 = \sum_i K_i * 2^{i-1}$$

In one implementation, the above-described process can be repeated for the pixels in the outer square of LBP8, thus generating a 16-bit (2 byte) LBP16 code for a particular interest point. Thus a total of 3 bytes of LBP code for each interest point can be generated. The process can be repeated for 5×5 pixel neighborhood of $(x_0,y_0)$, yielding a total of 5×5=25 repetitions of the above LB8(1 byte)+LBP16(2 bytes) calculations surrounding a particular center point, resulting in a 3×25=75 byte binary descriptor for each center interest point such as $(x_0,y_0)$. This 75 byte binary descriptor is designated as Extended Multi-Radii Local Binary Patterns (EMR-LBP). Windows are not confined to two; other sizes are possible based on image resolution.

In a EMR-CS-LBP-based implementation, the reference point for each pairwise pixel comparison includes the diagonally opposite pixel in an 8-pixel or 16-pixel neighborhood of the center point of interest, instead of the intensity value of the center point, thereby leading to half the number of bits compared to EMR-LBP features. Both EMR-LBP and EMR-CS-LBP descriptors are binary numbers.

HoG is typically calculated using a neighborhood of a certain size (in pixels) defined around an interest point. That neighborhood can be divided into a predefined number of sub regions, within which histograms of edge orientations at certain angles can be created and collectively used as the local descriptor for that interest point. These histogram-based descriptors are real number vectors. In one implementation, a neighborhood of size 4×4 pixels is tiled into 2×2 sub regions with histograms of orientations binned into 6, each 30 degrees apart, and are used as feature descriptors. In one implementation, a neighborhood of size 4×4 pixels tiled into 3×3 sub regions with histograms of orientations binned into 6 bins (each 30 degrees apart) can be used as feature descriptors.

HEMR-LBP descriptors can also be calculated using a neighborhood of a certain size (in pixels) around the interest point. EMR-LBP codes (as described above) for each pixel of the neighborhood are derived. That neighborhood of EMR-LBP codes is divided into a predefined number of sub regions. Next, to create histograms, counts for occurrence of each bit location within a sub-region are generated. The concatenations of these histograms of EMR-LBP codes across all the sub-regions can be designated as PH-EMR-LBP features. These descriptors are real number vectors. In various implementations, a neighborhood of size m×m pixels (m=4, 5, . . . , 11, etc.) is tiled into n×n (n=2, 3, . . . , 7, etc.) overlapping sub regions (tiles), and the concatenation of histograms of occurrence of each EMR-LBP bit location within a neighborhood or a sub-region can be used as feature descriptors. The choice of m and n can made based on the obtained image resolution. HEMR-LBP are similar PH-EMR-LBP but has no sub-regions as the histograms are calculated on the entire neighborhood. HLBP are similar to HEMRLBP but uses just a LBP.

In one implementation, a neighborhood of size 9×9 pixels (whose LBP8 and LBP16 codes are already generated, as described above) are tiled into sixteen 3×3 sub regions, each with one pixel overlap. Each 3×3 sub-region of LBP8 codes is converted to a string of nine unsigned 8-bit numbers, similarly LBP16 are converted to 9 unsigned 16-bit numbers. The unsigned 8-bit numbers of LBP8 strings are converted to unsigned 16-bit number strings. Histograms of occurrence of each bit location of 9 unsigned 16-bit strings are calculated, each can deliver a vector of length 16 bits. Thus, each sub region can have two vectors of length 16 from LBP8 and LBP16 codes that are concatenated to deliver a final length of 512 unsigned 16-bit numbers using 16 sub-regions (PH-EMR-LBP descriptor of the image patch).

PH-EMR-CS-LBP can be calculated using a neighborhood of a certain size (in pixels) around the candidate point. After generating EMR-CS-LBP codes for each pixel in the neighborhood, that neighborhood is divided into a predefined number of sub regions. Next, counts for occurrence of each bit location within a sub-region are generated. The concatenations of these histograms of EMR-CS-LBP codes can provide the PH-EM R-CS-LBP features. These descriptors are real numbers. A neighborhood of size m×m pixels (m=4, 5, 6, 7, 8, 9, 10, 11, etc.) can be tiled into n×n sub regions (n=2, 3, 4, 5, 6, 7, etc.), that can have overlapping tiles. The histograms of occurrence of each bit location within a neighborhood or a sub-region can be used as feature descriptors. The choice of m and n can be made based on the obtained image resolution. HEMR-CS-LBP are similar to PH-EMR-CS-LBP but has no sub-regions as the histograms are derived on the entire neighborhood.

In one implementation, a neighborhood of size 7×7 pixels (whose CS-LBP8 and CS-LBP16 codes are already generated as described above) are tiled into nine 3×3 sub regions, each with one pixel overlap. Each 3×3 sub-region of CS-LBP8 and CS-LBP16 codes is converted to string of nine unsigned 8-bit numbers for each of CS-LBP8 and CS-LBP16 code. Histograms of occurrence of each bit location are calculated that can yield 8 bins for CS-LBP8 and 8 bins for CS-LBP16. Concatenating all of the nine sub-regions can yield a vector length of 144 unsigned 16-bit numbers (PH-EMR-CS-LBP descriptor of the image patch).

In some implementations, feature descriptors for the image patch around an interest point can be derived from a single feature descriptor algorithm, or using a number of different feature descriptor algorithms described above. For example, one or more of the following descriptors can be used to characterize the image patch around each interest point for the purposes of creating a stage 1 template: EMR-LBP, CS-LBP, HoG, SURF, PH-EMR-LBP, and PH-EMR-CS-LBP. In some implementations, feature descriptors can be derived around candidate points at multiple image scales (yielding multi-scale feature extraction). For example, one may detect interest points and their corresponding local image descriptors using a three-stage Gaussian image pyramid. Other multi-scale image decompositions are possible.

Verification or Authentication via Matching

In general, matching is a process of finding similarity between one or more saved enrollment template(s) associated with a user against one or more verification template(s) of a claimant of that identity. If the similarity of claimant's verification template with the enrollment template (which can be expressed as match score) exceeds a specified threshold, the claimant can be verified as an authenticated user. Otherwise, the claimant can be rejected.

Stage 1 Pattern Matching

A stage 1 template, created at the time of enrollment or verification (step 110), can include derived interest points and the corresponding image feature descriptors around them. A Hamming distance is calculated for binary descriptors (FREAK, EMR-LBP and PEMR-CS-LBP) in order to find the best matched point pairs between enrollment and verification templates. The lower the Hamming distance the more similar the compared points. For real valued descriptor vectors, Euclidean, Manhattan, correlation, or Mahalanobis distance between SURF, HoG, PH-EMR-LBP and PH-EMR-CS-LBP descriptors of an enrollment template and the respective SURF, HoG, PH-EMR-LBP and PH-EMR-CS-LBP descriptors of the verification template can be computed to determine if one or more of those distances satisfy the specified, corresponding thresholds. Other distance measures can also be used in determining matching point pairs. In particular, one or more of the following histogram distance or similarity metrics can be used for matching histogram-based image descriptors such as PH-EMR-LBP and PH-EMR-CS-LBP: (i) a normalized absolute value of a histogram differences (ABSNdist_j), (ii) a histogram intersection similarity (INTRsim_j), (iii) a correlation coefficient similarity of histograms (CORRsim_j), and (iv) a Bhattacharyya distance (BHATdist_j).

Generally, a stage 1 template includes a set of $t_i$ (interest point, feature vectors) elements in the following format:

$$T=\{t_i\}, t_i=[(x_i,y_i),\vec{V}_i^1,\vec{V}_i^2,\ldots,\vec{V}_i^d], i=1,2,\ldots,n(T)$$

where $(x_i, y_i)$ is the location of interest point i, and $[\vec{V}_i^1, \vec{V}_i^2, \ldots, \vec{V}_i^d]$ is a collection of d different types of descriptor vectors that describe the local image patches around the point of interest at pixel coordinate $(x_i, y_i)$.

In some implementations, the matcher performs an exhaustive search (step 110), calculating the distances between each feature vector $\vec{V}_i^j$ associated with a point of interest i, for all interest points in enrollment template and all corresponding feature vectors of all points of interest in the verification template, to select one or more matching point pairs. In some implementations, a ratio test is implemented so that vague correspondences, with a first to second closest match distance ratio larger than a certain threshold, are discarded as ambiguous katches.

In other implementations, a kd-tree based technique can be used to match features using nearest neighbor algorithms implemented by Fast Library for Approximate Nearest Neighbors (FLANN) matcher. This can enable faster nearest neighbor searches among high dimensional data points.

In some implementations, a voting method across all or a subset of descriptors $V_i^k$, k=1, 2, ... d, can be used to select the corresponding matching points from the enrollment and verification templates. For example, one or more points from one template are paired with the corresponding one or more points from the other template only if a majority of the corresponding local image descriptors satisfy the distance threshold. The voting method can be used when each type of descriptor, by itself, may not reveal the same set of matched point pairs. Therefore, in one example, if the points in the two templates are matched using any three (at least) out of a total of five types of different descriptors the corresponding points in the verification template are considered as matched with the corresponding points in an enrollment template. Specifically, in one example, for each point of interest if the templates use five types of descriptors, namely, EMR-LBP, PH-EMR-LBP, PH-EMR-CS-LBP, HoG, and SURF descriptors, an interest point can be considered to be a candidate for a matched point pair if PH-EMR-LBP, PH-EMR-CS-LBP, and SURF descriptors pass the distance threshold, but not others, indicate a match.

In some implementations employing descriptor fusion, a single descriptor vector for an identified point can be obtained by combining all or a subset of the different types of descriptors used, e.g., SURF, HoG, EMR-LBP, EMR-CS-LBP, PH-EMR-LBP, and PH-EMR-CS-LBP descriptors, after normalizing the descriptors to be combined.

In some implementations, employing match metric based fusion, normalized distance scores from individual comparisons of different descriptors between enrollment and verification templates can be combined using a weighted average before comparing to a distance threshold to find corresponding matched pairs of interest points between the two templates. In multi-scale matching, the identified template points and their descriptors from different scales (e.g., scale 0, scale 1, and scale 2 from an image pyramid) of one template can be matched separately with those of the corresponding scales from the other template, or coordinates of points from lower scales can be up-scaled to scale 0 prior to matching.

In general, the points between two templates whose descriptors do not meet the distance threshold can be discarded from subsequent processing. Thereafter, the non-discarded locations can be used to find the inlier subset of point pairs between enrollment and verification images by fitting one or more affine transformation or similar geometric transformations as described below. A derivative of the number of inlier point pairs, their location correlations, and the required transform scale and rotation can then be used to generate the first stage match score. Other match score generation methods, including those taking into account descriptor similarity scores, can also be used.

In some implementations, a random sample consensus (RANSAC) or other outlier detection methods can be used to determine the transformation needed to align candidate points in the verification template with points of interest in the first enrollment, where the aforesaid points are the point pairs found in preceding descriptor match process. A RANSAC outlier detection method can reject outliers that do not fit a hypothesized geometric transformation between the corresponding points in a matched point pair, e.g., in terms of geometries of ocular regions of interest encoded in enrollment and verification templates via vascular patterns. For example, one or more transformation matrices can be applied to the points from the verification template in the matched pairs, generating a set of transformed points that are aligned with the corresponding points of the enrollment template in terms of their coordinates, if there is genuine match. The involved transformation can be derived from the largest consensus (inlier) subset of matched point pairs based on their descriptor matches. Hypothesis based outlier detection and image registration methods, such as RANSAC, can be used to identify one or more affine transformations or similar transformations that produce transformed template locations with the most inlier point pairs. An inlier point pair can include a point in a verification template that can be aligned to a point in enrollment template using a derived transformation matrix such that the Euclidean or other distance metric between the aligned points' locations does not exceed a distance threshold. An inlier point pair can also be a pair of points that yields the closest distance in descriptor space compared to other enrollment-verification point pairs and successfully survives RANSAC or similar outlier detection process. The outlier detection process assumes a geometric or limited elastic transform between inlier point pair locations from enrollment—verification template comparisons. In general, transformed points from verification template that are inliers are referred to as aligned points. The transformation of the verification image is not performed at stage 1.

A stage 1 match score can be generated based on a function of the correlation score of the inlier points across the enrollment and verification templates, plus a function of the number of inliers and recovered scale and rotation factors from the detected transformation matrix. In some implantations, other characterizing functions of the transformation matrix or matrices can be used. In some implementations, similarity metrics other than correlation can be used. For example, the number of inlier point pairs, N, can be used to measure the similarity between the enrollment and verification templates. A high number of inlier point pairs, for example, can indicate a higher first stage match score than a relatively low number of inlier point pairs. In some implementations, the correlation score is based on, for example, a distance between registered inlier point locations across the enrollment and verification templates, the distances between descriptors of corresponding matched points from the enrollment and verification templates, a correlation between the locations of the matched constellation of points between the enrollment and verification template points, a recovered registration scale and/or rotation between the two templates, which may be required for geometric alignment, or a combination of one or more of these and/or other measures. The correlation score can be used alone or in combination with another metric to determine the stage 1 match score.

In one example, the match score can be determined by calculating the x, y coordinate correlation between inlier interest points in the verification template and the corresponding points in enrollment template, and multiplying the correlation coefficient by N, i.e., the number of inlier point pairs.

In some implementations, the stage 1 match score is a normalized inlier pairs location' correlation score. In other implementations, the stage 1 match score (FMS) can be calculated as:

$$FMS = \frac{\left(\frac{Cx + Cy}{2}\right) * \log_2(N)}{(1 + |\log_2(RS + 0.001)|) * \left(1 + \left(\frac{RA}{0.2}\right)^2\right)}$$

where $C_x$ and $C_y$ are the correlation scores between the x and y coordinates, respectively, of the corresponding enrollment and verification template inliers points. N is the number of these inlier point pairs, RA is the recovered angle which represents a change in angle resulting from the transformation of the inlier matched verification points to the enrollment points, for registration, and RS is the recovered scale which represents a change in scale resulting from that transformation. RA and RS can be derived from the affine or similar transformation matrix resulting from RANSAC or similar operation that is used to identify the inlier point pairs.

The first stage match score, in terms of a function of Cx, Cy, N, and the transformation matrix-derived parameters, can also be directly learned using labeled dataset of impostor and genuine comparisons to training a classifier such as artificial neural network or linear discriminant analysis. Optionally, a principal component analysis (PCA) preprocessing stage maybe applied before classification. In some implementations, the local (non-binary) descriptors can be shortened using a PCA projection to eliminate post-PCA dimensions that do not contribute to local descriptor variances. This can improve classification accuracy while reducing feature dimensionality. The percentage of total variance retained for each family of descriptor set can vary. For instance, in one implementation of PCA projection and shortening, the dimensionality of pattern histograms of extended multi-radii local binary pattern features can be reduced to retain about 86% of their variance post-PCA shortening. Similarly, SURF based features can have their dimensionality reduced to retain about 85% of original variance through PCA, and pattern histograms of extended multi-radii center symmetric local binary patterns can be shortened to retain about 95% of their variance post PCA projection and shortening. The PCA loadings can be pre-calculated using a training database of ocular templates. Other percentages of variance shortening are possible; they depend on the Sharpening methods and noise levels in an image.

In some implementations, instead of transformation-matrix-derived parameters RS and RA, another function of the transformation can be directly calculated from the its matrix elements. Considering the transformation matrices derived from genuine and impostor comparisons, it is desired to create a function of corresponding transformation matrix elements yielding maximum genuine-impostor separation in its distribution. One way to achieve this end is to use the transformation matrices of a labeled dataset of impostor and genuine comparisons to train a regression function and maximize a measure of classifiability, such as Fisher discriminant ratio.

In some implementations, when multiple image scales are used to generate a multi-scale template of an image region, the point coordinates (but not the corresponding descriptors) that are not from the original scale can be multiplied by a scaling factor to project them to the original scale, combining inlier points (i.e., the corresponding points in the inlier point pairs) from all the scales by projecting them into the original scale. In some implementations, the stage 1 match score can be a weighted sum of several correlation scores from different RANSAC transformations generated from different combinations of interest point finders and feature descriptor types. In some implementations, the inlier points from the verification template can be replaced by the aligned points of geometrically transformed template to generate the stage 1 match score described above.

The stage 1 match score can be used, either individually or in combination, with one or more other measures to determine whether a verification template is similar enough to an enrollment template, so as to authenticate a user. In some implementations, if the recovered scale RS is below or above certain values, and/or if the recovered angle RA is above a certain threshold, a decision not to authenticate the user can be made using the stage 1 match score, and a stage 2 match score is not computed. In some implementations, if such failure to register occurs, a different or no registration algorithm can be used to still enable the stage 2 matching described below.

Stage 2 Pattern Matching

The verification image region is transformed (registered) for stage 2 matcher using a transformation matrix from the outlier detection process (e.g., RANSAC process) that can align points of the verification image region to points of the enrollment image region represented by the enrollment template (step 114). In some implementations, the transformation includes one or more affine or similar transformations that are applied to the verification image region. For example, the verification image region can be translated, scaled, skewed, and/or rotated to generate a transformed image region wherein points of the transformed image region are in positions similar to the positions of corresponding points in the enrollment image region.

A stage 2 match score can be generated, for example, by matching the oriented local binary patterns of the Gabor filtered enrollment and verification images. In some implementations, the transformed verification image region, after filtering, is used to derive oriented local binary patterns (OLBP) image (step 114).

In some implementations, the filtering process includes applying several convolutional filters to the transformed verification image region to generate a filtered verification image region. For example, a set of complex Gabor filters, or a set of complex logarithm of Gabor filters, at various angles can be applied to the transformed verification image region (step 112). The parameters of a Gabor filter can be determined empirically so as to account for variations in the spacing, orientation, and girth of the blood vessels depicted in an image region. The phase of a complex Gabor filtered image generally reflects the vascular patterns at different angles. The phase of the Gabor-filtered images can vary from $-\pi$ to $+\pi$ radians. For example, in the phase image filtered by a set of Gabor Kernels (for example, wavelength=6 pixel; spread (standard deviation) in x=2.5 pixel; spread in (standard deviation) y=2.5 pixel; angles=0°, 30°, 60°, 90°, 120°, 150°) the phase values above 0.25 and below −0.25 radians may correspond to vascular structures. Thresholding the phase image is not confined to 0.25 or −0.25, and this can be changed based on application and set of Gabor kernels used.

Figure 6:
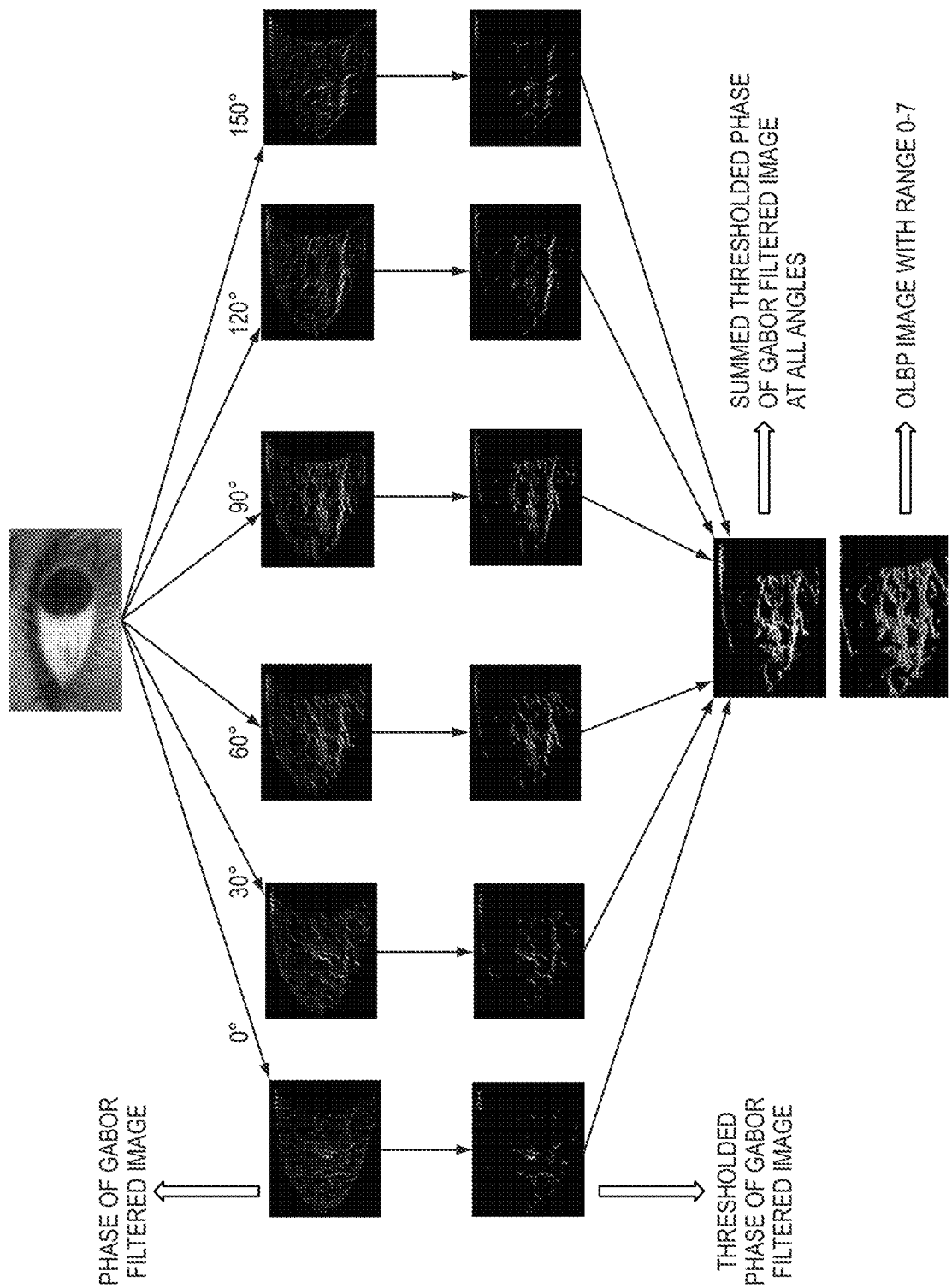
FIG. 6 depicts a Gabor filtered oriented local binary patterns (OLBP) image corresponding to an example eye vasculature.

In some implementations, to threshold the phase image, all values of phase above 0.25 or below −0.25 are maintained and the remaining values are set to zero to derive a thresholded image. This can result in a sharper depiction of the vasculature structure that is substantially free of noise in the corresponding phase image. This operation can be performed for images resulting from applications of several Gabor kernels at different angles. In some implementations, the resulting thresholded images can be added, resulting in a filtered image designed to reveal a fine and crisp vascular structure, such as that depicted in FIG. 6.

In some implementations, in generating stage 1 match score, the image regions to which the interest point finder (SURF, FAST, HS, and VPD) and/or local image descriptor algorithms (e.g., HoG, SURF, EMR-LBP, PH-EMR-LBP, EMR-CS-LBP and PH-EMR-CS-LBP) are applied as described above can be the magnitude of even Gabor filtered image region or magnitude of sum of all even Gabor filtered image regions at different angles or phase image region or sum of phase image regions at different angles or thresholded phase image regions or sum of all the thresholded phase image regions at different angles. In some implementations, a log Gabor kernel can replace Gabor kernel.

In general, the filtered image region can be used to derive an OLBP template (step 114). In some implementations, the filtered image region is a sum of thresholded phase images at different angles. To generate OLBP image, pixel windows, such as an example 3×3 pixel window depicted in FIG. 7A, are created for each non-border pixel in the filtered image region. A 3×3 pixel window generally includes a value for a center pixel, and values for eight surrounding pixels. Pixel windows of other sizes (e.g., 5×5, 7×7, etc.) can also be used. The values for each pixel can indicate, for example, an intensity of the corresponding pixel or the phase information for the pixel. In some implementations, pixel windows are not created for image border pixels, e.g., pixels at the outer border of the filtered image region, because the border pixels do not have eight surrounding pixels. Binary pixel windows can be created that have, for each of the eight surrounding pixels for a center pixel, a binary value that indicates whether the surrounding pixel has a value greater or equal than that of the center pixel, or less than the value (i.e., intensity or phase) of the center pixel. For example, the pixel window in FIG. 7A is binarized to create a binary pixel window, as depicted in FIG. 7B, which includes local high values, i.e., "1"s and logical low values, i.e., "0"s to indicate which surrounding pixel values were greater or equal or, alternatively, less than the center pixel value. For example, with reference to FIG. 7B, a value of "1" indicates that the associated pixel has a pixel intensity value greater than or equal to the pixel intensity value of the center pixel, and a value of "0" indicates that the associated pixel has a pixel intensity value less than the pixel intensity value of the center pixel.

For each binary pixel window, a position that corresponds to the center of the longest string of surrounding "1"s (or, in some implementations, "0"s) is identified (step 114). In the example binary pixel window shown in FIG. 7B, the numbers surrounding the window indicate pixel positions, and the longest string of surrounding "1"s is from position 0 through position 3. The center of that string of "1"s is between positions 1 and 2, and, in this implementation, the lesser position (i.e., position 1) is identified as the center of the longest string of surrounding "1"s. In some implementations, the greater position (e.g., position 2 in this example) can be identified as the center of the longest string of 1s.

After identifying the position of the center of the longest string of surrounding "1"s, a 4-bit binary Gray code can be generated (step 114). A binary Gray code is string of "1"s and "0"s where each successive value differs by only one bit. An example mapping position to Gray code for the example shown in FIG. 4B is "0001" (as shown in FIG. 7C). In this example, pixel position 1 was identified as the center of the longest string of surrounding "1"s, and position 1 corresponds to Gray code value "0001." This Gray code is generated for the pixel for which the 3×3 pixel window was created (i.e., the pixel in the center of the window depicted in FIGS. 7A and 7B). As OLBPs and Gray codes are identified for every non-border pixel in the filtered enrollment image region, each pixel can have a 4-bit Gray code that indicates an orientation of intensity for that pixel.

After generating a Gray code for each non-border pixel of the filtered enrollment image region, four binary layers can be generated for the filtered enrollment image region. Each binary layer (e.g., in a third dimension) corresponds to one bit of the 4-bit Gray code. For example, if a pixel at position (10, 10) has a Gray code value of "1100," the binary value at position (10, 10) of the first binary layer is "1," the binary value at position (10, 10) of the second binary layer is "1," the binary value at position (10, 10) of the third binary layer is "0," and the binary value at position (10, 10) of the fourth binary layer is "0." To generate stage 2 match score, a similar procedure is applied to the transformed verification image so as to generate a second Gray coded image, i.e., the stage 2 verification template, which can be compared with the first Gray coded image, i.e., the stage 2 enrollment template.

In some implementations, each binary layer can be tiled for enrollment-verification template comparison (step 114). In one example implementation, the binary layers are tiled into a 4×6 grid of 24 tiles. Tiling can avoid or minimize regions that do not include visible vasculature and, as such, are not significant for authentication. Tiling can also minimize registration artifacts. In some implementations, invalid tiles are identified and discarded from further analysis. For example, if the area corresponding to a particular tile does not include much visible eye vasculature, or includes a large portion of the skin or iris, the tile can be determined to be invalid. This validity determination can be made, for example, by comparing a sum of binary values of the area included in a tile to a threshold value, using eyelash detection algorithms, and/or using glare detection algorithms. In some implementations, a collection of aberration pixels (e.g. detected glare and eyelashes) that are within the white of eye, which in turn is determined by the segmentation process, can be generated. Whether one or more tiles are invalid can be determined based on the ratio of the number of aberration pixel counts to the number of the white of the eye pixels under the corresponding tiles.

The area of a tile within the white of an eye divided by the total area of the tile can reflect the extent of sclera within the tile. As such, in one implementation, tiles with less than 80% coverage within the sclera mask can be considered invalid and be therefore dropped. In some cases, portions of a tile area can be occluded by glare or eyelash or eyelid or other artifacts and occlusions, which if severe enough, can result in the tile being invalidated. The sclera mask is typically a binary image mask that excludes image pixels that do not belong to white of the eye. In some implementations, a measure of presence of vasculature can be used to discard the non-vascular tiles. For example, the area of tile that has the thresholded phase of Gabor values greater than zero divided by the total area of the tile can detect the amount of visible vasculature.

In various implementations, to determine a stage 2 match score, each bit in each binary layer of the Gray coded stage 2 verification template is compared to a corresponding bit in the corresponding layer of the Gray coded stage 2 enrollment image (step 114). For example, four binary layers of a stage 2 verification template can be compared in a layer-by-layer manner against the corresponding four layers of a stage 2 enrollment template. In some implementations, a stage 2 match score is based on a Hamming distance between the corresponding binary layers of the Gray coded verification and enrollment stage 2 templates, respectively. In some implementations, a stage 2 match score is based on a correlation between binary layers of the Gray coded stage 2 verification and enrollment templates. Sliding window correlation can be used to determine a correlation score for tiles of a binary layer. In implementations where binary layers are tiled, only the distance or correlation between valid tiles can be used for determining stage 2 match score. In some implementations, the Hamming distance can be normalized, e.g., to a value between 0 and 1, for the entire image region, or for each layer. For example, the normalized Hamming distance for each layer can be a number between 0 and 1, where "1" indicates an exact match (no difference) between binary values of a layer of the Gray coded stage 2 verification template and binary values of the corresponding layer of the stage 2 Gray coded enrollment template, and "0" indicates no matches. In some implementations, the correlation can be normalized, e.g., to a value between −1 and 1, for the entire image region, or for each layer.

The stage 2 match score can be generated, for example, by adding the normalized Hamming distances calculated for each pair of corresponding binary layer of the Gray coded stage 2 verification and enrollment templates, resulting in a stage 2 match score between 0 and 4. The stage 2 match score can, in some implementations, be further normalized to a value between 0 and 1. In some implementations, the stage 2 match score can be generated based on a normalized Hamming distance between tiles, e.g., by multiplying the number of valid tiles with a mean of normalized Hamming distance calculated across all valid tiles. For example, with four layers and 10 valid tiles in each layer, a stage 2 match score can be between 0 and 40, i.e., the sum of normalized Hamming distance for each of the tiles.

In some implementations, the stage 2 match score can be generated, for example, by adding the normalized correlation score calculated for each binary layer across the Gray coded stage 2 verification and enrollment templates, resulting in a stage 2 match score between −4 and 4. The stage 2 match score can, in some implementations, be further normalized to a value between −1 and 1. As another example, the stage 2 match score can be generated based on a normalized correlation between tiles, e.g., by multiplying the number of valid tiles with mean of normalized correlation calculated across all valid tiles. In some implementations, the stage 2 match score generated by correlation score can be compared to a threshold to determine whether a user providing the verification image can be authenticated. For example, if the stage 2 match score is less than 1.0 (on a scale of −4 to 4), the verification attempt can be rejected and the user is determined to be unauthorized.

Fusion

In two-stage fusion, the stage 2 match score can be combined with the stage 1 match score, to generate a third (final) match score (step 118). As such, in some implementations, the stage 1 match score and stage 2 match score can be multiplied and/or summed to generate the third match score. In some implementations, the third match score can be a weighted sum of the stage 1 match score and the stage 2 match score. Weights can be determined empirically based on historical match records. For example, historical instances of authentication failure and success can be analyzed to determine if the stage 1 match score is more indicative of an actual match than the stage 2 match score, or if certain match score values are more or less indicative of an actual match, and the corresponding data can be used to train one or more weights for the stage 1 and stage 2 match score. The third match score can be compared to a threshold score to determine if a verification image matches an enrollment image of an eye. In some implementations, the min or max fusion rule or a linear discriminant could be used to combine stage 1 and stage 2 match scores to generate a third match score.

In one implementation, several stage 1 scores are obtained, each one based on a different type of image sharpening, a different type of descriptor and a different RANSAC run. A weighted summation can be used to generate a fusion match score based on the various stage 1 match scores and one stage 2 match score. In one example, the following scores are obtained by matching stage 1 verification and enrollment templates:

Score1=Stage 1 (Point Finder=FAST and VPD at Scale 0 and Scale 1; Feature Descriptors=EMR-LBP)

Score2=Stage 1 (Point Finder=FAST and VPD at Scale 0 and Scale 1; Feature Descriptors=PH-EMR-LBP)

Score3=Stage 1 (Point Finder=FAST and VPD at Scale 0 and Scale 1; Feature Descriptors=PH-EMR-CS-LBP)

Score4=Stage 1 (Point Finder=FAST and VPD at Scale 0 and Scale 1; Feature Descriptors=SURF)

Score5=Stage 2 score using the transformation matrix corresponding to Score2.

The fusion score can be a weighted sum of all of the above-described scores, given by:

Fusion Score=0.1*Score1+0.2*Score2+0.2*Score3+ 0.2*Score4+0.1*Score5

The weights and combinations in the above example are for one implementation. Other combinations of pyramid scales, pyramid types, point finders, and feature descriptors can be employed. In some implementations, two or more stage 2 match scores can also be included in the fusion score.

In another implementation, the following scores are obtained by matching stage 1 verification and enrollment templates:

Score1=Stage 1 (Point Finder=FAST and VPD at Scale 0 and Scale 1; Feature Descriptors=PH-EMR-LBP)

Score2=Stage 1 (Point Finder=FAST and VPD at Scale 0 and Scale 1; Feature Descriptors=PH-EMR-CS LBP)

The fusion score can be a weighted sum of the above-described scores, given by:

Fusion Score=0.5*Score1+0.5*Score2

In another implementation, several stage 1 scores are obtained by applying several different RANSAC procedures and one stage 2 score is obtained. These scores can be combined using a weighted summation to generate the fusion match score. In one example, the following scores are obtained by matching verification and enrollment templates:

Score1=Stage 1 (Point Finder=FAST and VPD at Scale 0; Feature Descriptors=EMR-LBP, PH-EMR-LBP, PH-EMR-CS-LBP, SURF, HoG; RANSAC is run on points out of match metric based fusion)

Score2=Stage 1 (Point Finder=FAST and VPD at Scale 1; Feature Descriptors=EMR-LBP, PH-EMR-LBP, PH-EMR-CS-LBP, SURF, HoG; RANSAC is run on points out of match metric based fusion)

Score3=Stage 2 score, using the transformation matrix derived from Score1.

The fusion score can be a weighted sum of all of the scores, given by:

Fusion Score=0.4*Score1+0.3*Score2+0.3*Score3

It should be understood that the weights and combinations used in the examples above are illustrative only, and that other weights, number and types of descriptors, and RANSAC runs (inlier detection procedures, in general) can be employed. Other combinations of point finders, feature descriptors, pyramid scales, and pyramid types for match metric based fusion can be employed as well.

In another implementation, several stage 1 scores are obtained by applying several different RANSAC procedures on differently sharpened images. These scores can be combined using a weighted summation to generate the fusion match score. In one example, the following scores are obtained by matching verification and enrollment templates:

Score1=Stage 1 (Sharpening=LoG based; Point Finder=FAST and VPD at Scale 0; Feature Descriptors=EMR-LBP, PH-EMR-LBP, PH-EMR-CS-LBP, SURF, HoG; RANSAC is run on points out of match metric based fusion)

Score2=Stage 1 (Sharpening=LoG based; Point Finder=FAST and VPD at Scale 1; Feature Descriptors=EMR-LBP, PH-EMR-LBP, PH-EMR-CS-LBP, SURF, HoG; RANSAC is run on points out of match metric based fusion)

Score3=Stage 1 (Sharpening=Gabor based; Point Finder=FAST and VPD at Scale 0; Feature Descriptors=EMR-LBP, PH-EMR-LBP, PH-EMR-CS-LBP, SURF, HoG; RANSAC is run on points out of match metric based fusion)

Score4=Stage 1 (Sharpening=Gabor based; Point Finder=FAST and VPD at Scale 1; Feature Descriptors=EMR-LBP, PH-EMR-LBP, PH-EMR-CS-LBP, SURF, HoG; RANSAC is run on points out of match metric based fusion)

The fusion score can be a weighted sum of all of the scores, given by:

Fusion Score=0.3*Score1+0.2*Score2+0.3*Score3+ 0.2*Score4

It should be understood that the weights and combinations used in the examples above are illustrative only, and that other weights, number and types of descriptors, and RANSAC runs (inlier detection procedures, in general) can be employed. Other combinations of point finders, feature descriptors, pyramid scales, and pyramid types for match metric based fusion can be employed as well.

In some implementations, the fusion score is obtained using a single enrollment and a single verification template. In some implementations, a final match score can be generated by comparing one or more verification templates with one or more enrollment templates. For example, if there are two verification templates and two enrollment templates, four fusion scores can be generated. In some implementations, the final match score can be generated using a max rule or a sum rule. In other implementations, the match score of the highest N' inliers points (identified via several outlier detection runs) and/or the best quality score is selected as the final match score. In some implementations, match scores are generated serially until the match score reaches certain threshold or until all or a predefined number of selected comparisons are performed. In some implementations, the stage 1 match score can be used in combination with a stage 2 match score to generate a third match score for determining a degree of similarity between a verification template and an enrollment template. In some implementations, by way of match score fusion, the stage 1 match scores can be used to generate a third match score for determining a degree of similarity between a verification template and an enrollment template. In some implementations, by way of fusion, the stage 2 match scores can be used to generate a third match score for determining a degree of similarity between a verification template and an enrollment template.

Figure 8:
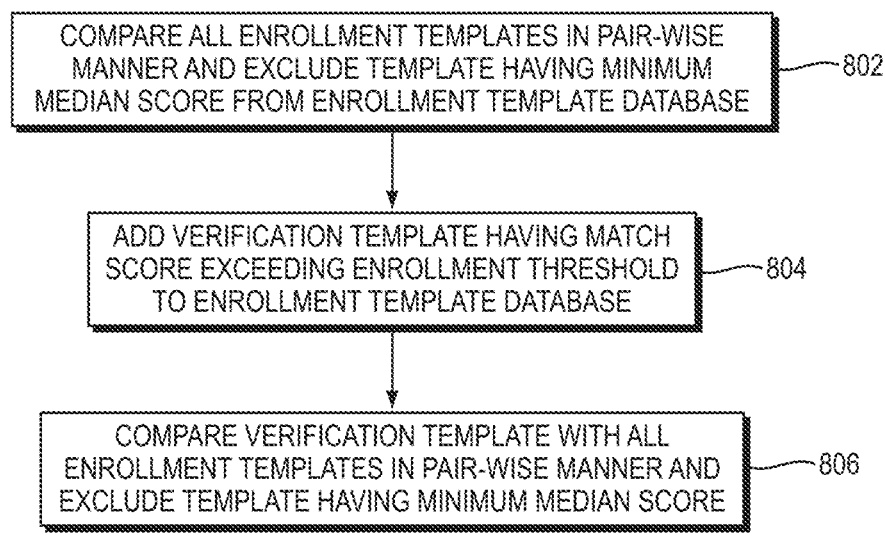
FIG. 8 illustrates an example process of updating enrollment templates on a rolling basis.

Rolling Template Update and Intelligent Template Recall for Multi-Template Matching FIG. 8 illustrates an example process of updating enrollment templates on a rolling basis. In order to efficiently manage several enrollment templates per each ocular ROI of a user, the enrollment templates stored in one or more template banks (e.g., the database 120 shown in FIGS. 1A and 1B) can be refined and updated. The number of enrollment templates to be stored can be optionally reduced at the time of enrollment. To this end, in one implementation, the initial N enrollment templates from each ROI are matched in a pair-wise manner against each other, and only those templates having the highest overall cross match scores are stored (step 802). For example, given the initial N enrollment templates, the N(N−1)/2 possible pairs are matched assuming a symmetric distance metric. Then, the template with the lowest median match score is excluded. The median match score can be a median of the N−1 match scores for each enrollment template, each one corresponding to a comparison of the template being tested for inclusion in an enrollment bank with the remaining N−1 enrollment templates. This procedure can be repeated to omit from the template bank or banks one or more additional enrollment templates.

In some implementations, a quality score is generated for all enrollment templates and the verification template. The verification and enrollment templates include sparse vascular points that are based on binary vascular maps (BVMs). In some implementations, the quality score corresponding to a template includes the ratio of true pixels (i.e., pixels designated a logical high value) in a thinned BVM associated with the template to the number of true pixels in the scleral mask used in generating that BVM. In another method, quality score of an enrollment and/or verification template can be calculated as a ratio of true pixels in a BVM associated with the template to the number of true pixels in the scleral mask. Quality score can provide a measure of amount of visible vasculature present in an ocular image in order to assess the eligibility thereof for further processing in a matching process. Enrollment images having a quality score below a certain threshold are not processed for inclusion in enrollment bank.

In some embodiments, the template bank or banks can be additionally or in the alternative, updated at the time of verification by adding qualified verification template(s) as additional enrollment template(s) or by replacing previously stored enrollment templates of lower quality with relatively better quality verification templates. To qualify, an incoming verification template has to match well with one or more enrollment templates, and optionally pass the earlier mentioned quality measure for that verification template to be added to the template bank (step 804). If the template bank cannot store the additional template, e.g., due to memory capacity constraint, number of enrollment templates constraint, etc., the least desirable previously stored enrollment template can be excluded, e.g., using the above process (step 806). In some embodiments, the lower quality enrollment template is preserved, nevertheless, if a larger enrollment bank is required, e.g., due to lack of sufficiently diverse templates from initial registration process, where diversity is defined as a measure of externally induced variations in templates while the genuine user scans his or her eyes under varying conditions.

In some embodiments, an exposure profile of each template in a multi-enrollment template system is also stored along with the template as a measure of template diversity (e.g., in step 108 shown in FIG. 1A). The exposure profile of each image corresponding to a template to be saved can be computed over a pre-registered ROI using a number of methods. Example methods include using the camera's intrinsic exposure metering variables (e.g. those found in the image's EXIF file), using the median, (mean, standard deviation) pair, and/or a histogram of the Y component in the YUV presentation of the image, or just the green layer, for exposure profile. In the latter case, to find the exposure similarity score between two captures, a histogram distance measure, such as Kolmogorov-Smirnov, normalized absolute difference, histogram intersection, mean squared error, Chi-squared based distance, Kullback-Leibler divergence, Bhattacharyya distance, or correlation coefficient, can be used. Sensitivity towards asymmetric lighting and spatial distribution of exposure can be increased by splitting the image into two or four segments (or other spatial arrangements, which can be overlapping), and by concatenating the above-described exposure measures calculated per each segment, before measuring exposure profile similarities.

The procedures described above are relatively straightforward statistical image similarity measures that can mostly reveal exposure and/or lighting induced differences between templates. To improve the accuracy of the similarity measure, the images can be pre-registered and cropped to the ROI of choice, e.g., a bounding box of whole eye or segmented sclera of specific gaze direction. In one implementation, pre-registration can be performed by finding a scale from inter-ocular distance, and translation from a combination of center of iris and/or sclera and/or eye. A rotation angle can be determined from a line connecting the former two points, and pre-registering can be accomplished using a similarity geometric transformation based on the scale, rotation angle, etc. During verification, the matching of an incoming verification template can start with the enrollment templates that have the most similar exposure profiles, which can reduce the match time in the first-best multi-comparison, i.e. by exiting with a match decision as soon as a match threshold is reached.

In some implementations, for exposure-aware rolling template update, the calculated match metric is modulated allowing for exposure diversity by providing a limited advantage to templates having different lighting and exposure conditions that those of the enrollment template (step 118, depicted in FIG. 1B). Such differences can put these verification templates at a disadvantage otherwise because their match scores are lower at least in part due to the exposure difference. In general, it is beneficial not to allow a significant exposure difference between the verification and enrollment templates to overcome the modulated metric, thereby erroneously allowing a close impostor template to be added to the enrollment template bank. Therefore, for templates $T_1$ and $T_2$, according to one linear implementation:

$$\text{enhanced\_match\_metric}(T_1, T_2) = a * \text{match\_score}(T_1, T_2) + (1-a) * (\min(\text{exposure\_difference}(T_1, T_2), \text{influnce\_threshold}))$$

The influnce_threshold can ensure that the exposure difference leverage does not exceed a certain level. A suitable influence_threshold can be determined according to parameter 'a' for best performance, over a labeled training dataset. According to the above enhanced match metric, a rather weak match but with a significant exposure difference between images that produced templates $T_1$ and $T_2$ can be a strong match without such exposure difference and, as such, the incoming verification template can be leveraged in order to be selected in a rolling template update. A measure of vascularity/image quality can be added to this formula to further ensure that templates from low-quality images (i.e., images lacking adequate well defined vascular structure due to blur, reflections and occlusions, etc.) are also not selected as enrollment templates.

In one implementation of the histogram-based exposure similarity metric, an ocular image is cropped to the bounding box of a scleral mask and is padded with a certain number of pixels (e.g., about 50 pixels), or otherwise the ocular image centered with respect to the eye. Then, a 64 bin histogram of the green layer of each quadrant of a first and second image is calculated. Other histograms such as 32 bin or 128 bin histograms can also be used. These histograms are stored alongside their corresponding templates as exposure profiles or exposure templates. Next, histogram distance or similarity metrics between histograms of each corresponding quadrants between the pair of templates is calculated. Specifically, the following metrics are calculated: normalized absolute value of histogram differences (ABSNdist), histogram intersection similarity (INTRsim), correlation coefficient similarity of histograms (CORRsim), and their Bhattacharyya distance (BHATdist). In other implementations, fewer and/or other metrics can be used. Finally, these metrics are combined into a single similarity metric as:

$$\text{similarity} = -1*\text{ABSNdist2} - 1*\text{ABSNdist1} - 1*\text{ABSNdist3} - 1*\text{ABSNdist4} - 1*\text{BHATdist2} - 1*\text{BHATdist1} - 1*\text{BHATdist3} - 1*\text{BHATdist4} + \text{INTRsim2} + \text{INTRsim1} + \text{INTRsim3} + \text{INTRsim4} + \text{CORRsim2} + \text{CORRsim1} + \text{CORRsim3} + \text{CORRsim4};$$

The higher the similarity metric, the more similar the two templates are. Dissimilarity or exposure difference can be a negated value of the similarity metric.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other. A number of embodiments have been described. Nevertheless, it will be understood that various modifications may be made without departing from the spirit and scope of the invention.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving a verification template comprising a plurality of points of interest, each point of interest being associated with a plurality of different respective descriptors that each describe one or more localities surrounding the corresponding point of interest;
   computing a match score for the verification template by comparing the verification template with one or more enrollment templates in a plurality of enrollment templates;
   prior to computing the match score, ordering the plurality of enrollment templates according to respective exposure differences between a verification exposure template associated with the verification template and a respective enrollment exposure template associated with each enrollment template in the plurality of enrollment templates; and
   adding the verification template to the plurality of enrollment templates based on, at least, the match score matching or exceeding an enrollment threshold.

2. The method of claim 1, further comprising adjusting the match score according to (i) an exposure difference between the verification exposure template and an enrollment exposure template associated with one of the enrollment templates and/or (ii) an influence threshold.

3. The method of claim 2, further comprising computing the exposure difference and/or an exposure similarity, based on at least one histogram measure.

4. The method of claim 1, further comprising generating the verification exposure template and/or the enrollment exposure template.

5. The method of claim 4, wherein generating the verification exposure template and/or the enrollment exposure template comprises:
   partitioning a region of interest (ROI) of an image corresponding to the verification template into at least two sections; and generating for each section a histogram of intensities representing, for each intensity in the histogram, a number of pixels in the section of the ROI having substantially that intensity.

6. The method of claim 5, further comprising selecting the ROI by cropping an image of an eye according to a boundary of a scleral mask.

7. The method of claim 5, further comprising selecting the ROI by cropping an image of an eye according to a boundary from one eye corner to another eye corner and from one eye lid to another eye lid.

8. The method of claim 4, wherein generating the verification exposure template and/or the enrollment exposure template comprises generating a plurality of exposure measures.

9. A system comprising:
  at least one processor; and
  at least one memory for storing computer-executable instructions that, when executed by the at least one processor, program the at least one processor to perform the operations of:
    receiving a verification template comprising a plurality of points of interest, each point of interest being associated with a plurality of different respective descriptors that each describe one or more localities surrounding the corresponding point of interest;
    computing a match score for the verification template by comparing the verification template with one or more enrollment templates in a plurality of enrollment templates;
    prior to computing the match score, ordering the plurality of enrollment templates according to respective exposure differences between a verification exposure template associated with the verification template and a respective enrollment exposure template associated with each enrollment template in the plurality of enrollment templates; and
    adding the verification template to the plurality of enrollment templates based on, at least, the match score matching or exceeding an enrollment threshold.

10. The system of claim 9, wherein the operations further comprise adjusting the match score according to (i) an exposure difference between the verification exposure template and an enrollment exposure template associated with one of the enrollment templates and/or (ii) an influence threshold.

11. The system of claim 10, wherein the operations further comprise computing the exposure difference and/or an exposure similarity, based on at least one histogram measure.

12. The system of claim 9, wherein the operations further comprise generating the verification exposure template and/or the enrollment exposure template.

13. The system of claim 12, wherein generating the verification exposure template and/or the enrollment exposure template comprises:
  partitioning a region of interest (ROI) of an image corresponding to the verification template into at least two sections; and
  generating for each section a histogram of intensities representing, for each intensity in the histogram, a number of pixels in the section of the ROI having substantially that intensity.

14. The system of claim 13, wherein the operations further comprise selecting the ROI by cropping an image of an eye according to a boundary of a scleral mask.

15. The system of claim 13, wherein the operations further comprise selecting the ROI by cropping an image of an eye according to a boundary from one eye corner to another eye corner and from one eye lid to another eye lid.

16. The system of claim 12, wherein generating the verification exposure template and/or the enrollment exposure template comprises generating a plurality of exposure measures.

* * * * *